United States Patent
Seo et al.

(10) Patent No.: US 10,649,379 B2
(45) Date of Patent: *May 12, 2020

(54) CRUM UNIT MOUNTABLE IN CONSUMABLE UNIT OF IMAGE FORMING APPARATUS AND IMAGE FORMING APPARATUS USING THE SAME

(71) Applicant: HEWLETT-PACKARD DEVELOPMENT COMPANY, L.P., Spring, TX (US)

(72) Inventors: Chang-keun Seo, Hwaseong-si (KR); Jin-boo Kim, Suwon-si (KR); Youn-jae Kim, Yongin-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 162 days.

This patent is subject to a terminal disclaimer.

(21) Appl. No.: 15/491,276

(22) Filed: Apr. 19, 2017

(65) Prior Publication Data
US 2017/0219975 A1 Aug. 3, 2017

Related U.S. Application Data

(63) Continuation of application No. 14/627,420, filed on Feb. 20, 2015, now Pat. No. 9,658,644.

(30) Foreign Application Priority Data

Oct. 6, 2014 (KR) .................. 10-2014-0134072

(51) Int. Cl.
*G03G 15/00* (2006.01)
*G06F 1/08* (2006.01)
(Continued)

(52) U.S. Cl.
CPC ......... *G03G 15/50* (2013.01); *G03G 15/0863* (2013.01); *G03G 15/553* (2013.01);
(Continued)

(58) Field of Classification Search
None
See application file for complete search history.

(56) References Cited

U.S. PATENT DOCUMENTS 4,132,981 A    1/1979  White
5,260,634 A *  11/1993 Tsuyuguchi .............. H02P 8/12
                                              318/696
(Continued)

FOREIGN PATENT DOCUMENTS

CN    101231490 A    7/2008
CN    101639636 A    2/2010
(Continued)

OTHER PUBLICATIONS

Notice of Allowance dated Jan. 11, 2017, in U.S. Appl. No. 14/782,544.
(Continued)

*Primary Examiner* — Santosh R Poudel
(74) *Attorney, Agent, or Firm* — Staas & Halsey, LLP

(57) ABSTRACT

A customer replacement unit monitor (CRUM) unit that can be mounted in an image forming apparatus includes a decoder which receives first clock signals from the image forming apparatus and converts the first clock signals into second clock signals, a memory which stores data related with a consumable unit, and a controller which manages the memory based on data signals transmitted from the image forming apparatus and the second clock signals. The first clock signals are divided into a data section in which the data signals are transmitted and received and an idle section in which the data signals are not transmitted and received. The
(Continued)

first clock signals have a first frequency on the data section while having a second frequency on the idle section, and the second clock signals are clock signals maintaining a high value or a low value on the idle section.

11 Claims, 19 Drawing Sheets

(51) Int. Cl.
    *G06F 3/06*     (2006.01)
    *G03G 15/08*     (2006.01)
    *G03G 21/18*     (2006.01)
(52) U.S. Cl.
    CPC .......... *G03G 21/1882* (2013.01); *G06F 1/08* (2013.01); *G06F 3/0604* (2013.01); *G06F 3/0629* (2013.01); *G06F 3/0653* (2013.01); *G06F 3/0673* (2013.01)

(56) References Cited

U.S. PATENT DOCUMENTS

| | | | |
|---|---|---|---|
| 6,014,533 A | 1/2000 | Kawana | |
| 6,101,123 A | 8/2000 | Kato et al. | |
| 6,874,047 B1* | 3/2005 | Duguay | G06F 13/4291 710/100 |
| 7,193,549 B1* | 3/2007 | Nanda | H03M 3/50 341/123 |
| 8,036,548 B2 | 10/2011 | Lee et al. | |
| 8,072,477 B2 | 12/2011 | Lee | |
| 8,073,355 B2 | 12/2011 | Lee et al. | |
| 8,220,894 B2 | 7/2012 | Karino et al. | |
| 8,233,812 B2 | 7/2012 | Lee et al. | |
| 8,386,781 B2 | 2/2013 | Cho | |
| 8,508,770 B2 | 8/2013 | Lee | |
| 8,548,342 B2 | 10/2013 | Lee et al. | |
| 8,817,293 B2 | 8/2014 | Lee | |
| 8,862,024 B2 | 10/2014 | Kubo et al. | |
| 8,938,176 B2 | 1/2015 | Xie | |
| 2005/0038970 A1* | 2/2005 | Kim | G06K 7/0008 711/167 |
| 2005/0095020 A1 | 5/2005 | Eom et al. | |
| 2006/0093383 A1 | 5/2006 | Buchheit | |
| 2006/0153578 A1 | 7/2006 | May | |
| 2007/0274137 A1* | 11/2007 | Park | G11C 7/1051 365/189.07 |
| 2008/0174653 A1 | 7/2008 | Lee | |
| 2008/0297820 A1 | 12/2008 | Karino et al. | |
| 2009/0024864 A1 | 1/2009 | Sugimoto | |
| 2009/0175393 A1 | 7/2009 | Priel et al. | |
| 2009/0214249 A1 | 8/2009 | Lee et al. | |
| 2010/0020350 A1 | 1/2010 | Lee et al. | |
| 2010/0028031 A1 | 2/2010 | Lee et al. | |
| 2010/0104313 A1 | 4/2010 | Kosaka et al. | |
| 2011/0149623 A1 | 6/2011 | Peak, Jr. et al. | |
| 2011/0205581 A1 | 8/2011 | Machii et al. | |
| 2011/0249292 A1 | 10/2011 | Hirano | |
| 2011/0318029 A1 | 12/2011 | Lee et al. | |
| 2012/0002771 A1 | 1/2012 | Nakagawa | |
| 2012/0051781 A1 | 3/2012 | Kubo et al. | |
| 2012/0062950 A1 | 3/2012 | Lee | |
| 2012/0275800 A1 | 11/2012 | Lee et al. | |
| 2013/0293922 A1 | 11/2013 | Lee | |
| 2014/0208126 A1* | 7/2014 | Mooney | G06F 13/14 713/300 |
| 2015/0049552 A1* | 2/2015 | Park | G11C 16/30 365/185.18 |

FOREIGN PATENT DOCUMENTS

| | | |
|---|---|---|
| CN | 101639637 A | 2/2010 |
| CN | 102375396 A | 3/2012 |
| EP | 1 681 814 A2 | 7/2006 |
| EP | 2101226 A1 | 9/2009 |
| EP | 2 568 344 A1 | 3/2013 |
| EP | 2 869 133 A1 | 5/2015 |
| EP | 2869133 | 5/2015 |
| JP | 2006-165708 | 6/2006 |
| JP | 2011-233140 A | 11/2011 |
| JP | 2013-218199 A | 10/2013 |
| KR | 10-2009-0028497 A | 3/2009 |
| KR | 10-2009-0090913 | 8/2009 |
| KR | 10-2012-0028794 A | 2/2012 |
| RU | 2420775 C2 | 6/2011 |
| WO | WO 2015/065081 A | 5/2015 |

OTHER PUBLICATIONS

Chinese Office Action dated Jul. 5, 201, in Chinese Patent Application No. 201480012807.5.
Mexican Office Action dated Aug. 11, 2016, in Mexican Patent Application No. MX/a/2015/009356.
Extended European Search Report dated Feb. 17, 2016, in European Patent Application No. 15189633.9.
Form PCT/ISA/237 Written Opinion of the International Searching Authority dated Feb. 16, 2015, in International Patent Application No. PCT/KR2014/010335.
Form PCT/ISA/210 International Search Report dated Feb. 16, 2015, in International Patent Application No. PCT/KR2014/010335.
Extended European Search Report dated Dec. 15, 2014, in European Patent Application No. 14191219.6.
Korean Office Action dated Jun. 23, 2014, in Korean Patent Application No. 10-2014-0016216.
Korean Office Action dated Feb. 16, 2015, in Korean Patent Application No. 10-2014-0147668.
Korean Notice of Allowance dated May 22, 2015, in Korean Patent Application No. 10-2014-0147668.
Australian Notice of Acceptance dated Aug. 12, 2015, in Australian Patent Application No. 2014340774.
Form PCT/IB/304 dated Nov. 7, 2014, in International Patent Application No. PCT/KR2014/010335.
U.S. Ex Parte Quayle Office Action dated Feb. 3, 2016, in related U.S. Appl. No. 14/782,544.
U.S. Notice of Allowance dated Jul. 21, 2016, in related U.S. Appl. No. 14/782,544.
Extended European Search Report dated Dec. 21, 2015, in corresponding European Patent Application No. 15180020.8.
Written Opinion of the International Searching Authority dated Jul. 6, 2015, in corresponding International Patent Application No. PCT/KR2015/003481.
International Search Report dated Jul. 6, 2015, in corresponding International Patent Application No. PCT/KR2015/003481.
English Translation Document of Allowed Claims for Korean Patent Application No. 10-2014-0147668.
U.S. Office Action dated Sep. 22, 2016, in U.S. Appl. No. 14/627,420.
U.S. Notice of Allowance dated Mar. 17, 2017, in U.S. Appl. No. 14/627,420.
U.S. Appl. No. 14/627,420, filed Feb. 20, 2015, Chang-keun Seo, Samsung Electronics Co., Ltd.
U.S. Appl. No. 14/782,544, filed Oct. 5, 2015, Youn-jae Kim, Samsung Electronics Co., Ltd.

* cited by examiner

210

210

210

CRUM UNIT MOUNTABLE IN CONSUMABLE UNIT OF IMAGE FORMING APPARATUS AND IMAGE FORMING APPARATUS USING THE SAME

CROSS-REFERENCE TO RELATED APPLICATIONS

This application is a continuation of U.S. Ser. No. 14/627,420, filed Feb. 20, 2015, and claims priority from Korean Patent Application No. 10-2014-0134072, filed on Oct. 6, 2014 in the Korean Intellectual Property Office, the disclosures of which are incorporated herein by reference in their entireties.

BACKGROUND

1. Field of the Invention

Units and apparatuses consistent with what is disclosed herein relate to a customer replacement unit monitor (CRUM) unit mountable in a consumable unit of an image forming apparatus, and an image forming apparatus using the same, and more specifically, to a CRUM unit which is able to use an existing universal memory controller while requiring a reduced number of connecting terminals to connect to an image forming apparatus, and an image forming apparatus using the same.

2. Description of the Related Art

Various types of electronic products are developed with the help of the advancing electronic technology. As the computers are widely distributed, the distribution rate of computer-related peripherals is enhanced. These peripherals are provided to enhance utilization of the computers. A representative example includes an image forming apparatus such as a printer, a scanner, a copy machine, or a multifunction unit.

The image forming apparatuses use an ink or a toner to print images on paper sheet. The ink or the toner is used (i.e., consumed) whenever an image forming job is performed, and depleted when used for a certain period time. In this case, a unit storing the ink or the toner should be newly replaced. An accessory or a unit that can be replaced during use of the image forming apparatuses is referred to as a consumable unit or a removable unit. The term 'consumable unit' will be used herein for convenience of explanation.

The consumable units include not only the units that need to be replaced due to depleting ink or toner, but also the units that need to be replaced for reduced possibility of provisioning good printing quality due to deteriorating features after a certain period of use. Specifically, not only the respective color developers, but also the component such as an intermediate transfer belt may correspond to a consumable unit, as the belt is depleted or "consumed" during use. This consumable unit needs to be replaced at proper replacement intervals.

The replacement intervals may be determined by using a use status index of the image forming apparatus. The use status index indicates the degree the image forming apparatus has been used, and may include, for example, a number of paper sheets printed and outputted in the image forming apparatus or a number of dots forming images. The image forming apparatus may determine the time for replacing each consumable unit by counting the number of paper sheets or dots.

Recently, each consumable unit is mounted with a customer replacement unit monitor (CRUM) unit for a user to correctly determine the time to replace the consumable unit.

When a consumable unit is mounted in the image forming apparatus, CRUM unit may communicate with the image forming apparatus through the consumable unit. The consumable unit includes a power terminal to receive the power provided from the image forming apparatus. Therefore, the power provided from the image forming apparatus is delivered to the power terminal, and CRUM unit may receive the power from the power terminal and operate accordingly.

However, in view of structure, the power terminal to provide the power may be one of factors to increase a number of terminals for the consumable unit or a number of interfaces for the CRUM unit. Further, increase in a number of terminals or interfaces may increase a size of the consumable unit or CRUM unit, which affects the cost of the consumable unit or CRUM unit.

Therefore, recently suggested is a method of connecting the image forming apparatus with CRUM unit only with three terminals (clock terminal, data terminal, and ground terminal) in which the power terminal is removed.

However, because the abovementioned method modifies the related method of generating clocks according to the standard I2C communication, there is a problem that the CRUM unit cannot be implemented using existing universal IC.

Therefore, a new method is necessary, which is capable of implementing CRUM unit by using an existing universal IC while reducing a number of connecting terminals between the image forming apparatus and CRUM unit.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an embodiment, a technical objective is to provide customer replacement unit monitor (CRUM) unit which is able to use an existing universal controller while requiring a reduced number of connecting terminals to connect to an image forming apparatus, and an image forming apparatus using the CRUM unit.

A technical objective is to provide a customer replacement unit monitor (CRUM) unit that can be mounted in an image forming apparatus, which may include a decoder configured to receive first clock signals generated from a body of the image forming apparatus and convert the received signals into second clock signals, a memory configured to store data related with a consumable unit and a controller configured to manage the memory based on data signals transmitted from the body of the image forming apparatus and the second clock signals. The first clock signals may be divided into a data section in which the data signals are transmitted and received and an idle section in which the data signals are not transmitted and received, the first clock signals having a first frequency on the data section while having a second frequency on the idle section, and the second clock signals may be clock signals maintaining a high value or a low value on the idle section.

The first frequency of the first clock signals on the data section may be smaller than the second frequency of the first clock signals on the idle section.

When a section maintaining either a high value or a low value regarding the first clock signals exceeds a predetermined time, the decoder may convert an output value of the second clock signals alternately based on a time corresponding to the first frequency at the time of exceeding the predetermined time, and when the section maintaining either the high value or the low value regarding the first clock signals is less than the predetermined time, the decoder may maintain an output value of the second clock signals.

The second clock signals may be compatible with clock protocols of inter-integrated circuit (I2C) bus.

The decoder may include an input configured to receive the first clock signals, a decoding controller configured to store standard time information, a decoding processor configured to generate the second clock signals based on the stored standard time information and the first clock signals, and an output configured to output the generated second clock signals.

The input may receive the data signals, and the output may output the data signals inputted to the input as they are.

The decoder may extracts power from the first clock signals, and provide the extracted power to at least one of the memory and the controller.

The CRUM unit may additionally include a power extract circuit configured to extract power from the first clock signals.

The controller may divide the data section or the idle section of the data signals based on the second clock signals, and transmit and receive the data signals on the data section.

The controller may determine that a section is changed into the data section when an edge of the second clock signals changes, and may determine that a section is changed into the idle section when a section maintaining either the high value or the low value regarding the second clock signals exceeds the predetermined time.

The memory and the controller may consist of at least one integrated circuit (IC).

The CRUM unit may additionally include a plurality of interfaces configured to be connected to the body. The plurality of the interfaces may additionally include a first interface configured to receive the first clock signals from a clock terminal of the body, and provide the received first clock signals to the decoder, a second interface configured to transmit and receive the data signals to and from a data terminal of the body, and a third interface configured to be connected to a ground terminal of the body.

The CRUM unit may additionally include a plurality of interfaces configured to be connected to the body. The plurality of the interfaces may additionally include a first interface configured to receive the first clock signals from the clock terminal of the body, and provide the received first clock signals to the decoder, a second interface configured to transmit and receive the data signals to and from the data terminal of the body, a third interface configured to be connected to a power terminal of the body, and a fourth interface configured to be connected to the ground terminal of the body.

Meanwhile, in one embodiment, an image forming apparatus may include a body including a main controller configured to control operation of the image forming apparatus, a consumable unit configured to be mounted in the body so as to perform communication with the main controller, and a customer replacement unit monitor (CRUM) unit configured to store information of the consumable unit. The main controller may transmit first clock signals having a first frequency on a data section in which data signals are transmitted and received and a second frequency on an idle section in which the data signals are not transmitted and received to and from the CRUM unit, and the CRUM unit may convert the first clock signals into second clock signals maintaining a high value or a low value on the idle section, and process the data signals by using the second clock signals.

The CRUM unit may include a decoder configured to convert the first clock signals generated from the body of the image forming apparatus into the second clock signals, a memory configured to store data related with the consumable unit, and a controller configured to manage the memory based on the data signals transmitted from the body of the image forming apparatus and the second clock signals.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1:
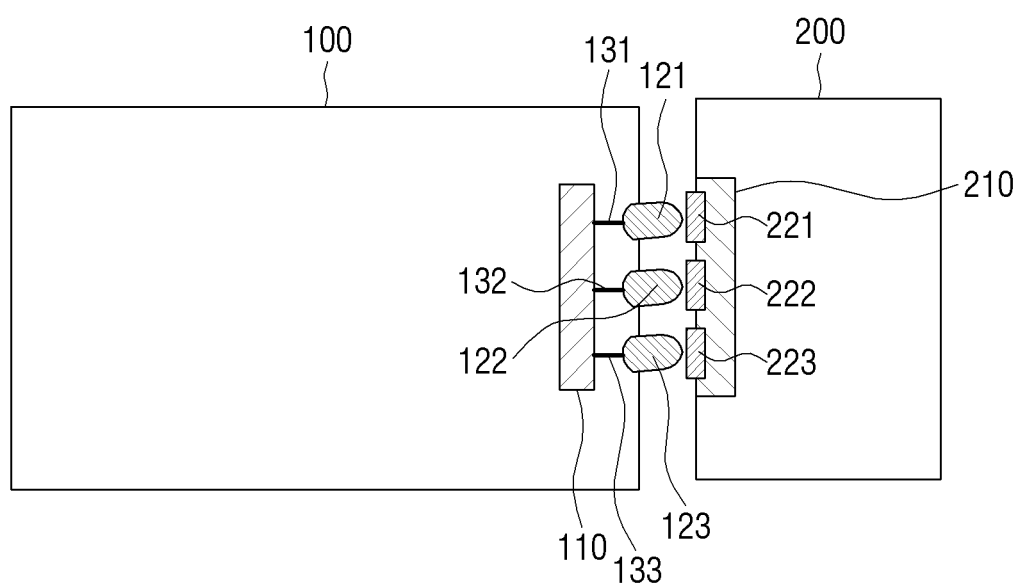
FIG. 1 is a block diagram of an image forming apparatus according to an embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 is a block diagram of an image forming apparatus according to an embodiment.

Referring to FIG. 1, the image forming apparatus includes a body 100, a main controller 110 provided in the body 100, and a consumable unit 200 that can be attached to and detached from the body 100. Herein, the image forming apparatus is a device for performing generating, printing, receiving, and transmitting of image data, which may be exemplified to be a printer, a copy machine, a fax or a multifunction unit combining the above functions. Although embodiments will be described herein with reference to an example of an apparatus for forming images (i.e. image forming apparatus), the embodiments may be also applied to an image reading apparatus such as scanner, or to an apparatus which operates as both an image forming apparatus and an image reading apparatus.

The main controller 110 may be mounted in or on the body 100 of the image forming apparatus and control overall functions of the image forming apparatus. Specifically, the main controller 110 may include a controller (not illustrated) to control each unit within the image forming apparatus, and perform printing jobs according to control commands inputted by a user.

Further, the main controller 110 may transmit signals for the recording of information regarding consumable units used for performing image forming jobs and the reading of the information regarding the consumable units to customer replacement unit monitor (CRUM) unit 210.

Herein, the main controller 110 may communicate with the CRUM unit 210 either through three interface terminals consisting of clock signals, data signals and ground, or through four interface terminals consisting of first clock signals, data signals, power, and ground. In both of the above examples, the main controller 100 may generate and transmit to the consumable unit 200 the first clock signals having a first frequency on a data section in which the data signals are transmitted and received, while having a second frequency on an idle section in which the data signals are not transmitted and received. Meanwhile, the first clock signals are clock signals incompatible with I2C protocols. Thus, according to an embodiment, the first clock signals received from CRUM unit 210 may be converted and used as second clock signals compatible with I2C protocols. Herein, the interface terminals may be provided to connect terminals included within the body, and may thus be referred to as the 'connectors'.

Meanwhile, specific operation and constitution of an example of using the three interface terminals will be explained below by referring to FIGS. 8 to 10, and specific operation and constitution of an example of using the four interface terminals will be described below by referring to FIG. 11.

The consumable unit 200 may be various types of units mounted in the body 100 of the image forming apparatus, and involved in image forming jobs directly or indirectly. Regarding the laser image forming apparatus for example, the consumable units may be electrical charging unit, exposing unit, developing unit, transfer unit, fixing unit, various rollers, belt, or OPC drum. Additionally, other various types of units such as developing unit (e.g., developing cartridge or toner cartridge) that need replacement during use of the image forming apparatus may also be defined as consumable unit 200.

As described above, the consumable unit 200 may have a limited service life. Therefore, the CRUM unit 210 may be attached to and detached from the consumable unit 200 so that the replacement can be performed at a proper time.

The CRUM unit 210 is mounted in the consumable unit 200 and records various pieces of information. The CRUM unit 210 may consists of one single chip, or a plurality of elements integrated on a board. Meanwhile, by the above statement that the CRUM unit 210 is mounted in the consumable unit, it means that CRUM unit 210 can be physically attached to the consumable unit. Thus, the CRUM unit 210 may be connected electrically to the body while being mounted in the consumable unit 200. Further, depending on cases, the CRUM unit 210 may be directly connected to the body of the image forming apparatus physically and electrically, without requiring the consumable unit.

The CRUM unit 210 includes a memory. Therefore, the CRUM unit 210 may be interchangeably referred to as 'memory' or 'CRUM unit memory', for convenience of explanation, it will be herein referred to as the 'CRUM unit 210'.

The memory of the CRUM unit 210 may store various pieces of feature information regarding the consumable unit 200, the CRUM unit 210, and the image forming apparatus, use information related with implementation of image forming jobs, or programs.

Specifically, various programs stored in the CRUM unit 210 may include an operating system (O/S) program and an encrypt program, as well as existing applications. Further, the feature information may include information regarding a manufacturer of the consumable unit 200, information regarding a manufacturer of the image forming apparatus, a device name of image forming apparatuses that can be mounted, information regarding a manufacturing date, a serial number, a model name, an electronic signature information, an encrypt key, or encrypt key index. Further, the using information may include information regarding how many paper sheets have been printed up to now, how many paper sheets are left for printing jobs, and how much amount the toner remains. The feature information may be also referred to as unique information.

For one example, various pieces of information may be stored on the CRUM unit 210 include:

TABLE 1

| General Information | |
|---|---|
| OS Version | CLP300_V1.30.12.35 Feb. 22, 2007 |
| SPL-C Version | 5.24 Jun. 28, 2006 |
| Engine Version | 6.01.00(55) |
| USB Serial Number | BH45BAIP914466B. |
| Set Model | DOM |
| Service Start Date | Sep. 29, 2007 |

| Option | |
|---|---|
| Total Page Count | 774/93 Pages(Color/mono) |
| Fuser Life | 1636 Pages |
| Transfer Roller Life | 864 Pages |
| Tray 1 Roller Life | 867 Pages |
| Total Image Count | 3251 Images |
| Imaging Unit/Deve Roller Life | 61 Images/19 Pages |
| Transfer Belt Life | 3251 Images |
| Toner Image Count | 14/9/14/19 Images(C/M/Y/K) |

| Toner Information | |
|---|---|
| Custom Color | SAMSUNG(DOM) |

TABLE 1-continued

SAMSUNG(DOM)
SAMSUNG(DOM)
SAMSUNG(DOM)
SAMSUNG(DOM)

Color Menu

| | |
|---|---|
| Power Save | 20 Minutes |
| Auto Continue | On |
| Altitude Adj. | Plain |

In the above table, the memory of the CRUM unit 210 may store information regarding a service life of the consumable unit, information of the consumable unit and information regarding setup menu, in addition to brief information regarding the consumable unit 200. Further, the memory may store O/S to be used by the CRUM unit itself separately from the body of the image forming apparatus.

Additionally, the CRUM unit 210 may further include a CPU (not illustrated) for managing the memory, implementing various programs stored in the memory, and communicating with controllers of the body in the image forming apparatus or other devices.

Meanwhile, when the consumable unit 200 including the CRUM unit 210 is mounted in the body 100 of the image forming apparatus, the CRUM unit 210 may communicate with the main controller 110 through a plurality of the terminals through each of the terminals 121, 122, 123 in the body 100 of the image forming apparatus.

For example, the body 100 of the image forming apparatus includes the three terminals 121, 122, 123 in which each of cables 131, 132, 133 connected to the three terminals 121, 122, 123 may be connected to the main controller 110. In this case, the consumable unit 200 may also include the three terminals 221, 222, 223 contacting with the three terminals 121, 122, 123 included in the body 100. Because the three terminals 221, 222, 223 are connected to the CRUM unit 210, the CRUM unit 210 may communicate with the main controller 110 through the three terminals 221, 222, 223 included in the consumable unit 200. Meanwhile, the above example describes that the three terminals 221, 222, 223 are included in the consumable unit for convenient explanation. However, the three terminals 221, 222, 223 may be terminals of the CRUM unit 210.

The three terminals 121, 122, 123 included in the body 100 may be clock terminal, data terminal, and ground terminal, respectively. Likewise, the three terminals 221, 222, 223 included in the consumable unit 200 or the CRUM unit 210 may be clock terminal, data terminal and ground terminal, respectively.

The clock terminal 221 of the consumable unit 200 may receive the clock signals, by being connected to the clock terminal 121 included in the body 100 of the image forming apparatus. Further, the data terminal 222 of the consumable unit 200 may transmit and receive the data signals by being connected to the data terminal 122 included in the body 100 of the image forming apparatus. The ground terminal 223 of the consumable unit 200 may be connected to the ground terminal 123 included in the body 100 of the image forming apparatus.

Meanwhile, when the first clock signals are received through the clock terminal 221, the CRUM unit 210 may convert the received signals into the second clock signals, and transmit and receive the data signals with the body 100 of the image forming apparatus by using the converted second clock signals. Herein, the first clock signals may be signals having a first frequency on the data section and a second frequency on the idle section, and may be changed I2C clock signals to extract the power. This will be described below. Further, the second clock signals may be signals having a predetermined frequency only on the data section, and maintaining a high value or a low value on the idle section while being compatible with the clock protocols of I2C bus.

Meanwhile, the CRUM unit 210 may extract the power from the clock signals when the clock signals are received through the clock terminal 221. Thus, the CRUM unit 210 may provide the power by charging a capacitive element (e.g., capacitor) when the clock signals have a high value. Specific operation of extracting power will be described below by referring to FIGS. 12 and 13.

According to an embodiment, the method of extracting the power may be implemented to be various methods according to wave forms of the clock signals. Further, wave forms of the clock signals may be different according to the data section where the data signals are received and the idle section where the data signals are not received.

According to an embodiment, the first clock signals may have a clock wave form in which a high value and a low value are alternately repeated according to a predetermined pattern on the idle section.

Thus, the first clock signals may maintain the clock wave form even on the idle section. In this case, the clock signals on the data section may have a first frequency (or a first pulsewidth) and a second frequency different from the first frequency (or a second pulsewidth different from the first pulsewidth) on the idle section. Herein, the first frequency may be established to be smaller than the second frequency; however, it may not be limited to the above.

Specifically, regarding the first clock signals, a high value and a low value may alternately be repeated within the time of the preset second pulsewidth on the idle section, and within the time of the preset first pulsewidth on the data section. Lengths of a high value and a low value may be different or same in the length of the first time or the second time. Thus, in the first time or the second time, length of a high value may be longer, shorter, or same compared to length of a low value. Herein, a high value may be 3V or 4V. Further, a low value may be above zero, but less than a high value. Alternatively, a low value may be zero.

According to an embodiment, because the clock signals include a high value on the idle section and the data section, the CRUM unit 210 may be operated by extracting the power from a high value of the clock signals on the idle section and the data section. Specifically, because a high value and a low value of the clock signals are repeated based on the time of the second pulsewidth on the idle section, the CRUM unit 210 may be continuously operated without a recess of the power by repeatedly extracting the power from a high value. Thus, in a related I2C communication method, the capacitor may be discharged and an IC may malfunction according to operating status of software because the clock signals maintain a low value on the idle section between the data. Further, the operation of the image forming apparatus may be delayed because a reset occurs due to the falling of the power and the access should start from the beginning due to a loss in temporary storing data and certification data. Because frequent resetting may lead to a loss in the CRUM unit, it may be difficult to implement the technology of charging the capacitor with the clock signals and using the power.

When the power is extracted from the data signals, consecutive low values may be possibly maintained regarding the data, and the above described problem may occur.

According to another embodiment, regarding the clock signals, a high value and a first low value may alternately be repeated based on a predetermined first time on the data section while one of a high value and a second low value may be maintained for a time longer than the first time on the idle section. Herein, a high value may be 3V or 4V. Further, a second low value may be above zero and less than a high value. Also, a first low value may be same as the second low value or zero.

According to another embodiment, the first clock signals may maintain a second low value exceeding zero on the idle section, and may include a high value on the data section. Thus, the operating may be performed by extracting the power from a second low value on the idle section and a high value on the data section.

Meanwhile, the CRUM unit 210 may receive the first clock signals in which one of a high value and a second low value is maintained during a second time longer than the first time. Therefore, regarding the idle section, the power may be extracted from one value constantly maintained on a corresponding section among a high value and a second low value of the first clock signals.

The CRUM unit 210 according to the above embodiment may not require an interface for connecting to the power terminal, and thus, a cost regarding CRUM unit 210 can be reduced because a size of the CRUM unit 210 and a number of interfaces may decrease. Further, because the power terminal may not be provided and circuits to control the power terminal may not be necessary, circuits can have simpler structure.

Further, the CRUM unit 210 may convert the transmitted first clock signals incompatible with the clock protocols of I2C bus into the second clock signals compatible with the clock protocols of I2C bus and use the same. Thus, the CRUM unit may be implemented by using an existing universal IC operating with I2C bus.

Figure 2:
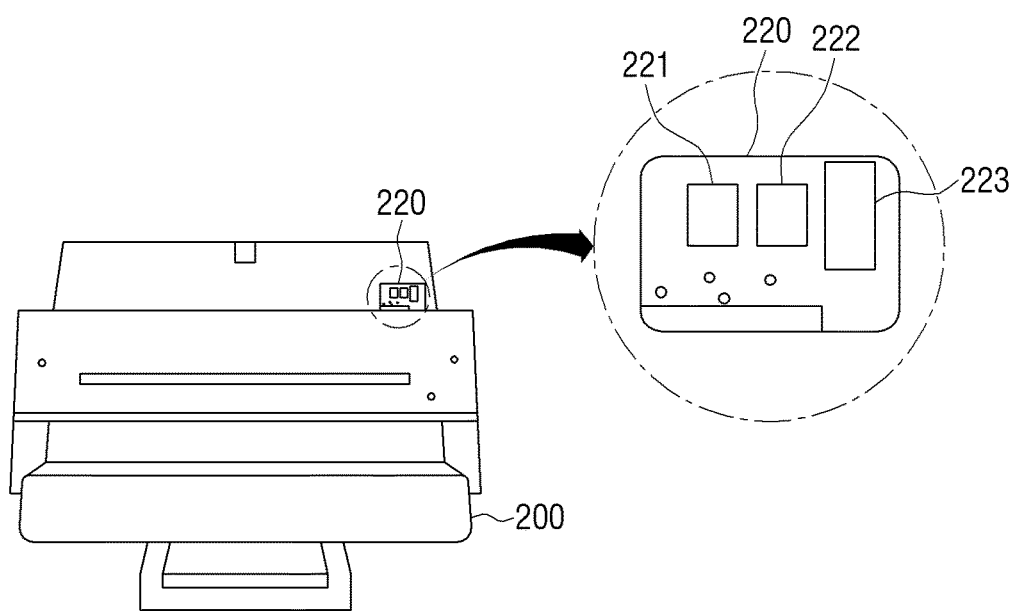
FIG. 2 illustrates one side of the consumable unit shown in FIG. 1.

FIG. 2 illustrates one side of the consumable unit shown in FIG. 1.

Referring to FIG. 2, the consumable unit 200 may include a terminal unit 220 to communicate with the main controller 110 provided on the image forming apparatus. The terminal unit may be one part of CRUM unit 210. The terminal unit 220 may include the clock terminal 221, the data terminal 222 and the ground terminal 223, as shown in FIG. 1.

The clock terminal 221, the data terminal 222, and the ground terminal 223 may be classified as contact type, and connected electrically by contacting the three terminals 121, 122, 123 provided on the body 100 of the image forming apparatus.

Meanwhile, the above embodiment describes that the clock terminal 221, the data terminal 222, and the ground terminal 223 may be formed on the consumable unit 200. However, the above terminals may be formed on the CRUM unit 210 in certain implementation.

Figure 3:
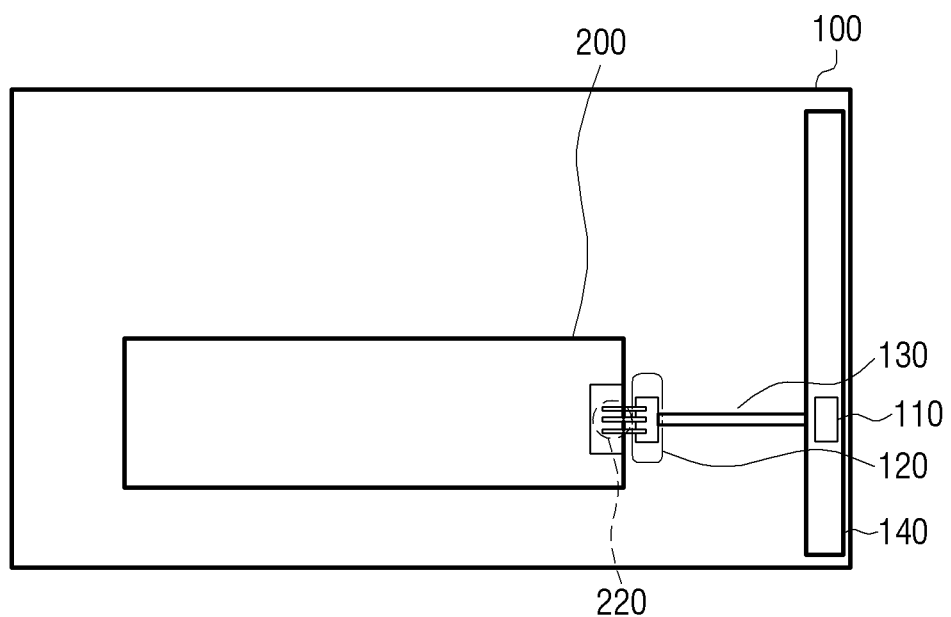
FIGS. 3 and 4 are views provided to explain a connecting method between an image forming apparatus and a consumable unit.
Figure 4:
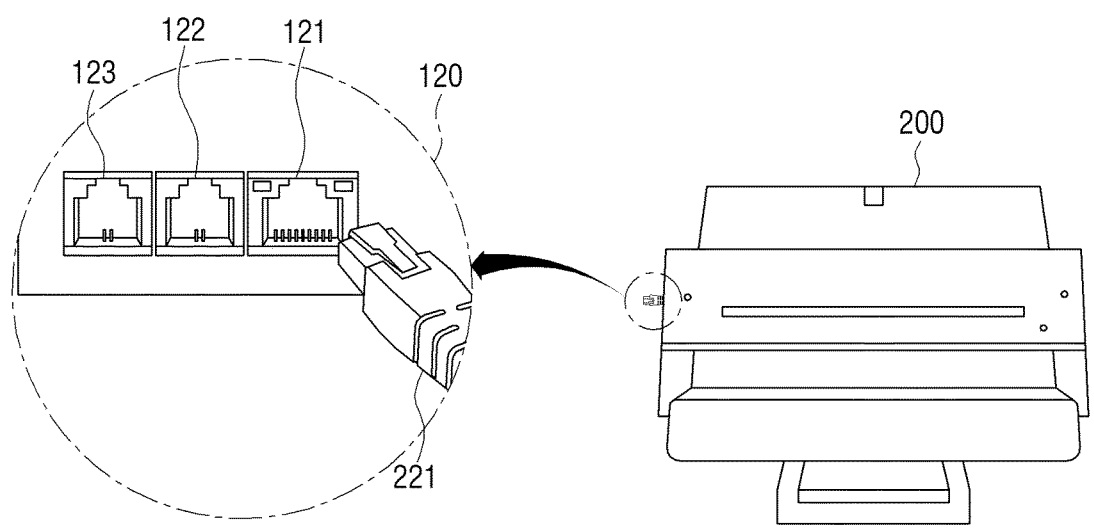

FIGS. 3 and 4 are views provided to explain a method of connecting the image forming apparatus with the consumable unit.

Specifically, FIG. 3 illustrates the connecting between the consumable unit 200 implemented to be contact type and the body 100 of the image forming apparatus.

Referring to FIG. 3, the body 100 of the image forming apparatus may include a main board 140 to arrange a plurality of units such as terminal unit 120 and main controller 110 and a connecting cable 130 to connect the main board 140 with the terminal unit 120.

When the consumable unit 200 is included in the body 100 of the image forming apparatus, the terminal unit 220 included in the consumable unit 200 and the terminal unit 120 of the body 100 may be drawn to contact each other for electrical connection. Herein, the terminal unit 220 may be also one part of the CRUM unit 210.

FIG. 4 illustrates an example of exterior constitution of a connector-type terminal unit 220.

Referring to FIG. 4, the body 100 of the image forming apparatus may include a port-type terminal unit 120 in which a connector can be inserted. The terminal unit 120 may include the three terminals 121, 122, 123.

The consumable unit 200 may include a connector-type clock terminal 221. The clock terminal 221 may be inserted into the clock terminal 121 provided on the terminal unit 120.

Further, although not shown in the drawings, the consumable unit 200 may further include the data terminal 222 and the ground terminal 223 in the connector type. The above two terminals may be inserted into the data terminal 122 and the ground terminal 123 provided on the terminal unit 120, respectively.

Although the above describes that the consumable unit 200 is connected to the body 100 through the three terminals, the consumable unit 200 may be connected to the body 100 through four terminals in certain implementation. Further will be explained below by referring to FIG. 5.

Figure 5:
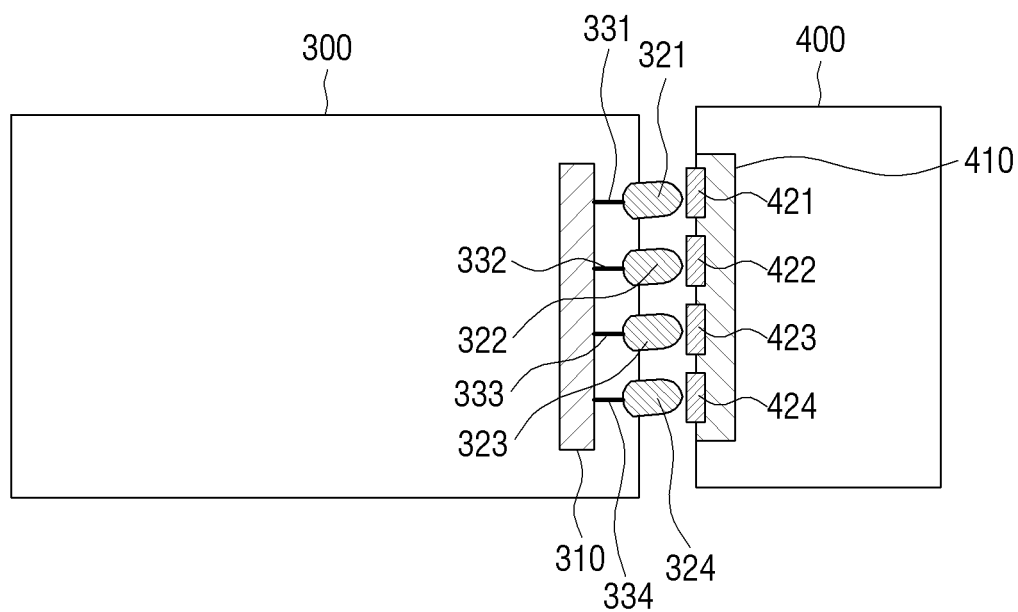
FIG. 5 is a block diagram of an image forming apparatus according to another embodiment.

FIG. 5 is a block diagram of the image forming apparatus according to another embodiment.

Referring to FIG. 5, the image forming apparatus includes the body 300, the main controller 310 provided on the body 300, and the consumable unit 400 that can be mounted in the body 300.

When the body 300 of the image forming apparatus includes the consumable unit 400 provided with the CRUM unit 410 as shown in FIG. 5, the CRUM unit 410 may communicate with the main controller 310 of the image forming apparatus through the consumable unit 400.

The main controller 310 may be electrically connected to the consumable unit 400 from the four terminals 321, 322, 323, 324 provided on the body 300 through the cables 331, 332, 333, 334 connected to the terminals 321, 322, 323, 324 respectively.

Further, the consumable unit 400 includes the four terminals 421, 422, 423, 424 contacting with the four terminals 321, 322, 323, 324 of the body 300.

According to an embodiment, the four terminals 321, 322, 323, 324 included in the body 300 may be clock terminal, data terminal, power terminal, and ground terminal, respectively. Likewise, the four terminals 421, 422, 423, 424 included in the consumable unit 400 may be also clock terminal, data terminal, power terminal, and ground terminal.

Meanwhile, the clock terminal 421 of the consumable unit 400 may receive the first clock signals by being connected to the clock terminal 321 included in the body 300 of the image forming apparatus. Further, the data terminal 422 of the consumable unit 400 may transmit and receive the data signals by being connected to the data terminal 322 included in the body 300.

Further, the power terminal 423 of the consumable unit 400 may be connected to the power terminal 323 included in the body 300, and the ground terminal 424 of the consumable unit 400 may be connected to the ground terminal 324 of the body 300.

Meanwhile, when the CRUM unit 410 may extract the power from the first clock signals, the power terminal 323 included in the body 300 of the image forming apparatus may be maintained in the inactivating state. In this case, the power terminal 323 may not be used to provide the power.

When the CRUM unit 410 does not extract the power by using the clock signals, the power terminal 423 of the consumable unit 400 may provide the power from the body to each unit within the CRUM unit 410.

Further, the consumable unit 400 may be standardized to be four terminals corresponding to the image forming apparatus. Therefore, the consumable unit 400 may also include the four terminals 421, 422, 423, 424.

Meanwhile, the CRUM unit 410 may further include a plurality of interfaces (not illustrated) to connect with the four terminals 421, 422, 423, 424 included in the consumable unit 400. Among a plurality of interfaces, one interface may be connected to the power terminal 423 included in the consumable unit 400.

Meanwhile, currently commercialized image forming apparatuses and consumable units usually include the four terminals including the clock terminal, the data terminal, the power terminal and the ground terminal. Therefore, when modifying or updating protocols only related with the clock signals stored in the main controller of the currently commercialized image forming apparatus, the CRUM unit 410 according to an embodiment may be mounted and used. Thus, existing CRUM unit may be compatible with the CRUM unit 410.

Meanwhile, according to another embodiment, the four terminals 321, 322, 323, 324 included in the body 300 of the image forming apparatus may be clock terminal, first data terminal, second data terminal, and ground terminal. Likewise, the four terminals 421, 422, 423, 424 included in the consumable unit 400 may be clock terminal, first data terminal, second data terminal, and ground terminal.

The clock terminal 421 of the consumable unit 400 may receive the clock signals by being connected to the clock terminal 321 included in the body 300 of the image forming apparatus. Further, the first data terminal 422 of the consumable unit 400 may transmit and receive the data signals by being connected to the first data terminal 322 included in the body 300 of the image forming apparatus. Further, the second data terminal 423 of the consumable unit 400 may be connected to the second data terminal 323 included in the body 300 of the image forming apparatus. The ground terminal 424 of the consumable unit 400 may be connected to the ground terminal 324 included in the body 300 of the image forming apparatus.

The body 300 of the image forming apparatus and the consumable unit 400 may respectively include the two data terminals (322 and 323, 422 and 423), and thus, the main controller 310 and CRUM unit 410 may transmit and receive the data signals through the data terminals contacted to each other (322 and 422, 323 and 423).

Specifically, when the main controller 310 transmit and receives the data signals from the CRUM unit 410, it may transmit and receive the data signals through the first data terminal 322. According to the above operation, the CRUM unit 410 may transmit and receive the data signals through the first data terminal 422 connected to the first data terminal 322.

Meanwhile, when the CRUM unit 410 transmits the data signals to the main controller 310, it may transmit the data signals through the second data terminal 423. According to the above operation, the main controller 310 may transmit and receive the data signals through the second data terminal 323 connected to the second data terminal 423.

Meanwhile, according to the above embodiments, the CRUM unit 410 may generate the second clock signals from the received first clock signals when the first clock signals are received. The method of converting the clock signals is described above by referring to FIG. 1, which will not be further explained.

Therefore, the CRUM unit 410 may be activated by extracting the power from the clock signals if the body 300 of the image forming apparatus and the consumable unit 400 include or exclude the power terminals.

Figure 6:
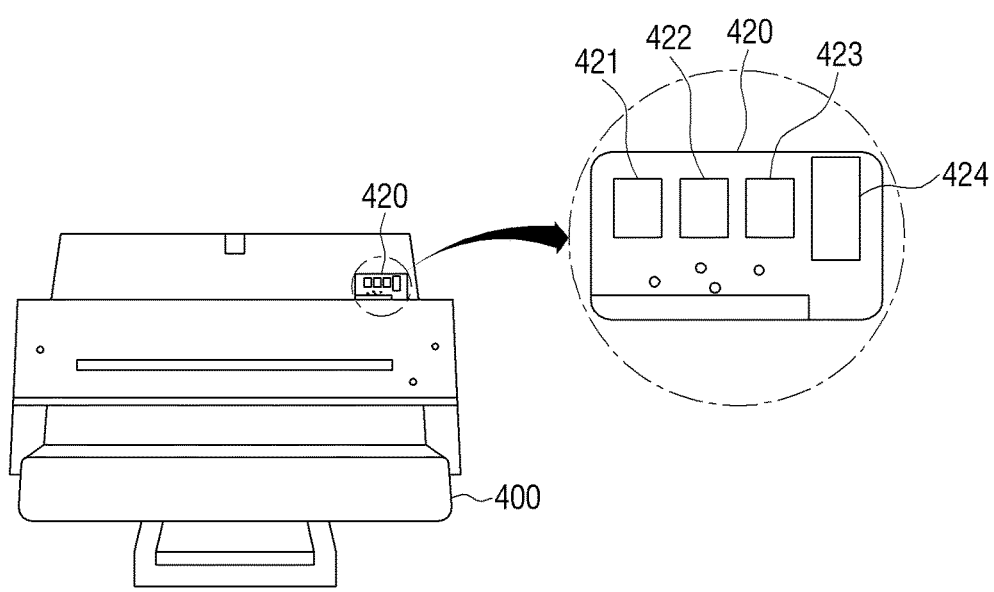
FIG. 6 illustrates one side of the consumable unit shown in FIG. 3.

FIG. 6 illustrates one side of the consumable unit shown in FIG. 5.

Referring to FIG. 6, the consumable unit 400 includes the terminal unit 420 to communicate with the main controller 310 provided on the image forming apparatus.

The terminal unit 420 may include the four terminals 421, 422, 423, 424 to be connected to the four terminals 321, 322, 323, 324 included in the body 300 of the image forming apparatus.

In other words, the terminal unit 420 may additionally include one terminal 423 as well as clock terminal 421, data terminal 422 and ground terminal 424. The one additional terminal 423 may be power terminal or additional data terminal according to the implementing.

The four terminals 421, 422, 423, 424 may be classified as contact type, and connected electrically by contacting to the four terminals 321, 322, 323, 324 provided on the body 300 of the image forming apparatus.

Meanwhile, when explaining FIGS. 2 to 5, the above describes that the consumable unit may be connected to the body of the image forming apparatus, and thus, the CRUM unit may be connected to the body through the consumable unit. However, this explanation is provided for the case in which the CRUM unit is physically mounted on the consumable unit. The CRUM unit and the consumable unit may be physically separated and implemented. In this case, the CRUM unit may be connected to the body of the image forming apparatus physically and electrically without using the consumable unit. Further, the terminals of the consumable unit in FIGS. 2 to 6 may be used as terminals of the CRUM unit.

Further, even when the CRUM unit is attached on the consumable unit, i.e., when the CRUM unit is mounted in the body through the consumable unit physically, the CRUM unit may be connected to the body electrically without passing through the consumable unit. Also in this case, the terminals of the consumable unit in FIGS. 2 to 6 may be used as terminals of the CRUM unit.

Figure 7:
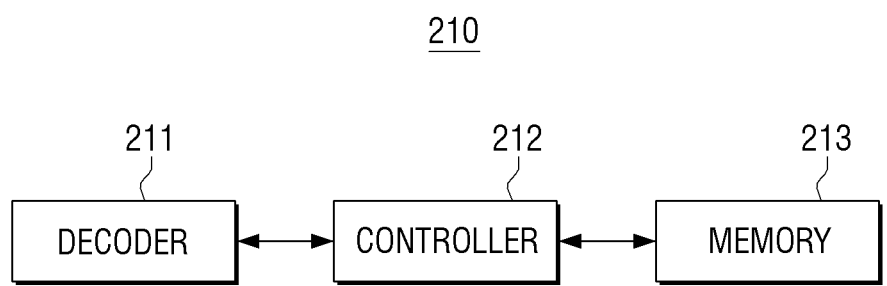
FIG. 7 is a schematic block diagram of customer replacement unit monitor (CRUM) unit according to an embodiment.

FIG. 7 is a schematic block diagram of the CRUM unit according to an embodiment.

Referring to FIG. 7, the CRUM unit 210 may include a decoder 211, a controller 212, and the memory 213.

The decoder 211 may receive the first clock signals generated from the body 100 of the image forming apparatus through the consumable unit 200, and convert the received first clock signals into the second clock signals. Specifically, when a section maintaining one of a high value and a low value regarding the first clock signals exceeds a predetermined time (e.g., T_Change), the decoder 211 may convert an output value of the second clock signals alternately based on a time corresponding to a first frequency at the time of exceeding the predetermined time. When a section maintaining one of a high value and a low value regarding the first clock signals is less than the predetermined time, the decoder 211 may maintain an output value of the second clock signals. Meanwhile, specific constitution of the decoder 211 will be described below by referring to FIG. 14.

The decoder 211 may extract the power from the received first clock signals. Specifically, the decoder 211 may extract the power by only extracting DC component from the first clock signals with a diode and the capacitor, or extract the power from the first clock signals with a plurality of resistances, a switch and the capacitor.

The controller 212 manages the memory 213 based on the data signals and the second clock signals. Specifically, the controller 212 may transmit and receive the data signals with the body 100 based on the second clock signals provided from the decoder 211. More specifically, the controller 212 may distinguish the data section and the idle section of the data signals based on the second clock signals, and transmit and receive the data signals with the body 100 of the image forming apparatus on the divided data section. For example, when an edge of the second clock signals changes on the idle section, the controller 212 may determine that a section is changed into the data section. Further, when a section maintaining one of a high value and a low value regarding the second clock signals exceeds the predetermined time, the controller 212 may determine that a section is changed into the idle section.

The memory 213 may store data related with the consumable unit. Information stored in the memory within the CRUM unit 210 is already described above by referring to FIG. 1, which will not be further explained below.

The CRUM unit according to the above embodiment may convert and use the received clock signals into the clock signals compatible with the clock protocols of I2C bus. Thus, the CRUM unit may be implemented by using an existing universal memory IC.

Figure 16:
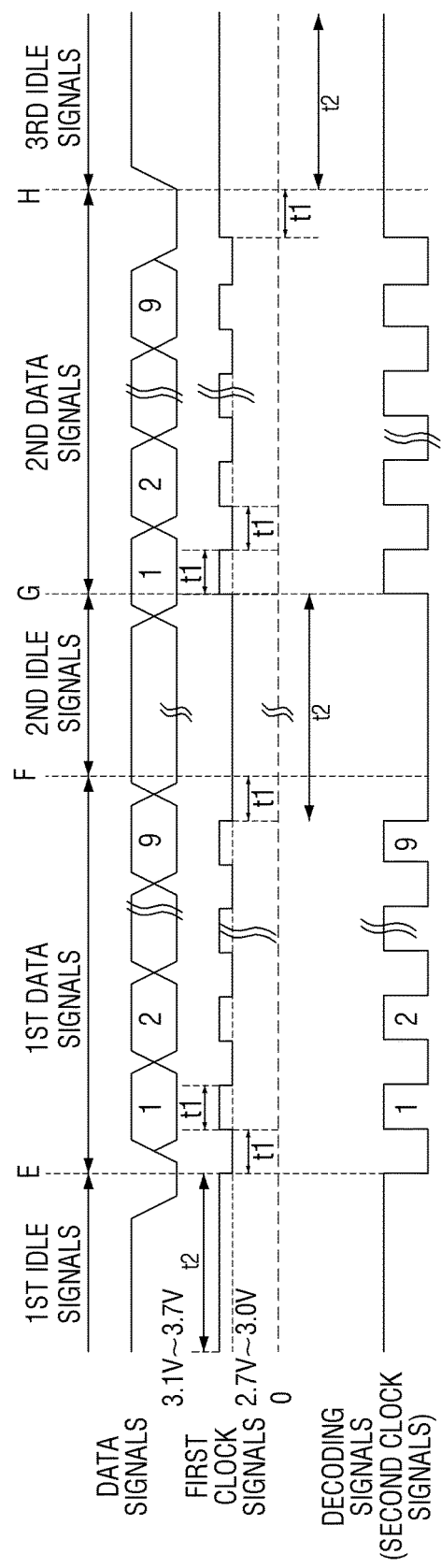
Figure 17:
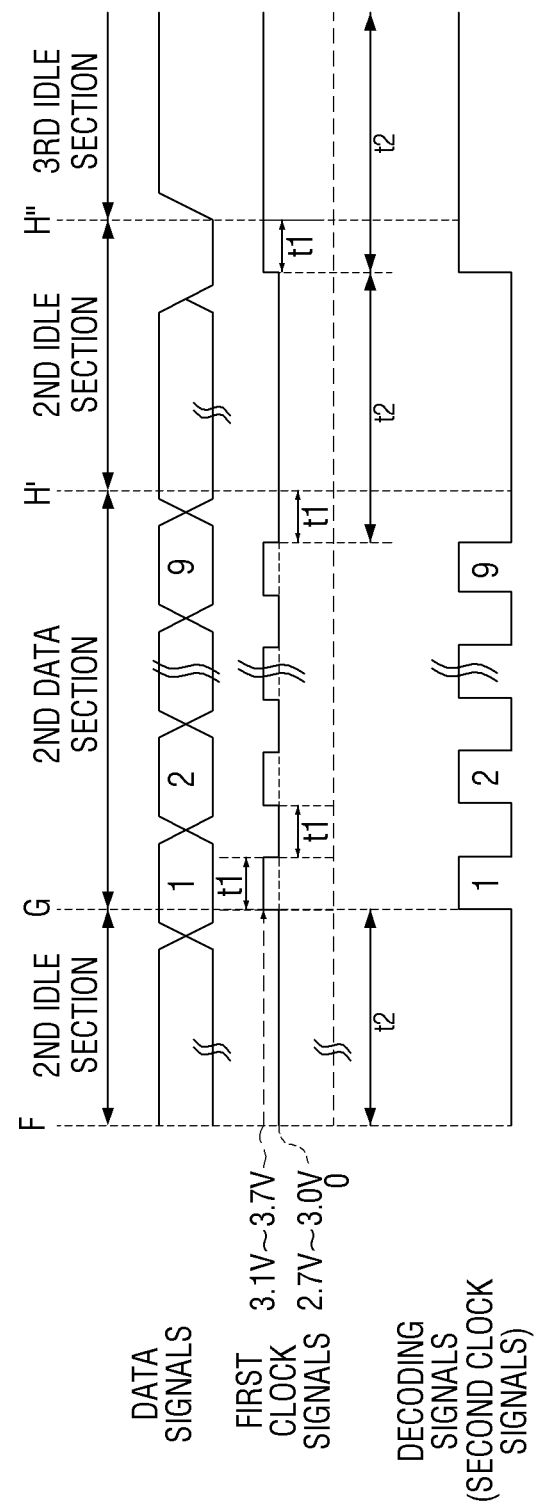

The above explains the operation of the decoder 211 by assuming that the first clock signals have a predetermined frequency even on the idle section. However, the decoder 211 may be implemented to convert the first clock signals into the decoding signals compatible with I2C protocols as shown in FIGS. 16 and 17 even when the first clock signals do not have a predetermined frequency on the idle section, as shown in FIGS. 16 and 17.

Meanwhile, although the above explains that the decoder 211 may extract the power from the first clock signals, another exterior circuits than the decoder 211 (i.e., power extract circuit) may extract the power from the first clock signals in certain implementation.

Figure 8:
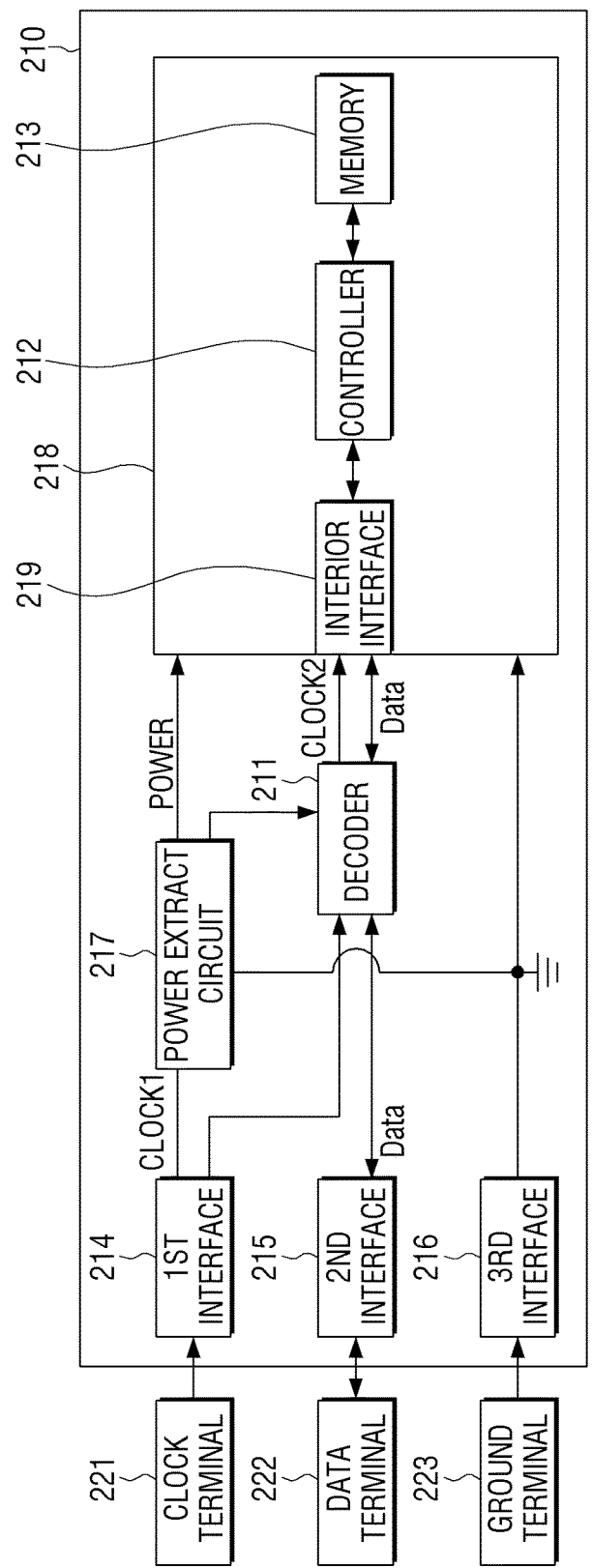
FIG. 8 is a detailed block diagram of a CRUM unit according to an embodiment.

FIG. 8 is a detailed block diagram of a CRUM unit according to an embodiment.

Referring to FIG. 8, the CRUM unit 210 may include the first to third interfaces 214, 215, 216, the power extract circuit 217, the decoder 211 and the controlling unit 218.

The first to the third interfaces 214, 215, 216 may be connected respectively with the clock terminal 221, the data terminal 222, and the ground terminal 223 included in the consumable unit 200, and may communicate with the image forming apparatus.

Specifically, the first interface 214 may receive the first clock signals from the image forming apparatus through the clock terminal 221, and the second interface 215 may transmit and receive the data signals from the image forming apparatus through the data terminal 222. Further, the third interface 216 may be connected to the ground terminal 223.

The power extract circuit 217 may be connected to the first interface 214, and extract the power from the first clock signals when the first clock signals are received through the first interface 214. The first clock signals may have different wave forms according to sections of the data signals received through the second interface 215, and may be implemented to be various forms.

According to an embodiment, the first clock signals may have a first pulsewidth on the data section in which the data signals are received and a second pulsewidth different from the first pulsewidth on the idle section in which the data signals are not received. In this case, the first pulsewidth may be preferably greater than the second pulsewidth.

Further, the first clock signals may have different frequencies of the clock signals to each other on the data section and the idle section. Specifically, the clock signals may have a wave form in which a high value and a low value may be alternately repeated based on a predetermined first time on the idle section (i.e., the clock signals may move with a first frequency), and in which a high value and a low value may be alternately repeated based on a predetermined second time longer than the first time on the data section (i.e., the clock signals may move with a second frequency smaller than the first frequency).

Further, the first clock signals may have a wave form in which a high value and a low value may be alternately repeated based on the predetermined first time on the data section, and in which a predetermined value which is not zero may be maintained on the idle section.

Therefore, when the first clock signals have a wave form in which a high value and a low value may be alternately repeated on both of the idle section and the data section, the power extract circuit 217 may extract the power from a high value on the idle section and the data section. Herein, a high value may be 3V or 4V. Further, a low value may be above zero, but less than a high value. Alternatively, a low value may be zero.

Meanwhile, when the first clock signals may have a second low value (i.e., constant value which is not zero) on the idle section while a high value and a low value may alternately be repeated only on the data section, the power extract circuit 217 may extract the power from a high value on the data section, and extract the power from a constantly maintained value among a high value and a second low value on the idle section. Herein, a high value may be 3V or 4V while a second low value may be above zero and less than a high value.

The decoder 211 may receive the first clock signals from the first interface 214, and convert the received first clock signals into the second clock signals. Specifically, the first clock signals may have various shapes as described above; the decoder 211 may convert the first clock signals into the second clock signals compatible with I2C protocols.

For example, when the first clock signals may have a first pulsewidth on the data section and a second pulsewidth different from the first pulsewidth on the idle section while having a uniform frequency on both of the data section and the idle section, or when the first clock signals may have different frequencies to each other on the data section and the idle section, the decoder 211 may output the signals having a pulsewidth or a frequency corresponding to the first clock signals and having a high value and a low value which are alternately repeated on the data section, and convert into the second clock signals outputting a high value or a low value constantly on the idle section.

Meanwhile, when the first clock signals may have a first pulsewidth on the data section and output a second low value which is not zero on the idle section, the decoder 211 may output the signals having a pulsewidth or a frequency corresponding to the first clock signals and having a high value and a low value which are alternately repeated on the data section, and convert into the second clock signals outputting a high value or a low value constantly on the idle section. Further operation of the decoder 211 will be described below by referring to FIGS. 15 and 16.

The decoder 211 may by-pass the received data signals through the second interface 215 and provide the signals to the controlling unit 218. Meanwhile, although the above describes that the data signals are provided to the controlling unit 218 through the decoder 211, in certain implementation, the data signals may be provided to the controlling unit 218 without passing through the decoder 211. Further operation of the decoder 211 will be described below by referring to FIGS. 16 and 17.

The controlling unit 218 may include an interior interface 219, a controller 212 and a memory 213. The controlling unit may consist of one IC (integrated circuits), or may be scattered and consisting of a plurality of IC.

The interior interface 219 may receive the inputting of the power delivered from the power extract circuit 217, may receive the inputting of the second clock signals and the data signals delivered from the decoder 211, and may be ground through the third interface 216.

The controller 212 may manage the memory 213 based on the data signals and the second clock signals delivered from the interior interface 219. The operation of the controller 212 is already described above by referring to FIG. 7, which will not be further explained below.

The memory 213 may store data related with the consumable unit. Information stored on the memory within the CRUM unit 210 is described above by referring to FIG. 1, which will not be further explained below.

According to the above embodiments, the CRUM unit 210 may operate without another power terminal by extracting the power from the clock signals received through the first interface 214. Thus, the CRUM unit 210 may not have a request to include the interface to be connected to the power terminal, and a size of the CRUM unit 210 and a number of interfaces can be reduced.

Further, even if the clock signals are changed to be incompatible with I2C protocols in order to provide the power, the decoder may modify and use the clock signals to be compatible with I2C protocols. Therefore, the CRUM unit may consist of a universal IC using the communication with I2C protocols.

Meanwhile, the above describes that the controlling unit 218 and the interior interface 219 are separate units when explaining FIG. 8. However, in certain implementation, the above two units may be constituted to be one unit. Further, the two units may be implemented to be one IC with the memory, as described above.

Further, the above describes that the decoder 211 is arranged on the exterior of the controlling unit 218 and implemented to be separate IC. However, the decoder 211 and the controlling unit 218 may be implemented to be one unit. Further will be explained below by referring to FIG. 10.

The above also describes that the power is extracted and used by using the separate power extract circuit when explaining FIG. 8. However, the decoder 211 may perform the extracting the power in certain implementation. The relevant will be described below by referring to FIG. 9.

Figure 9:
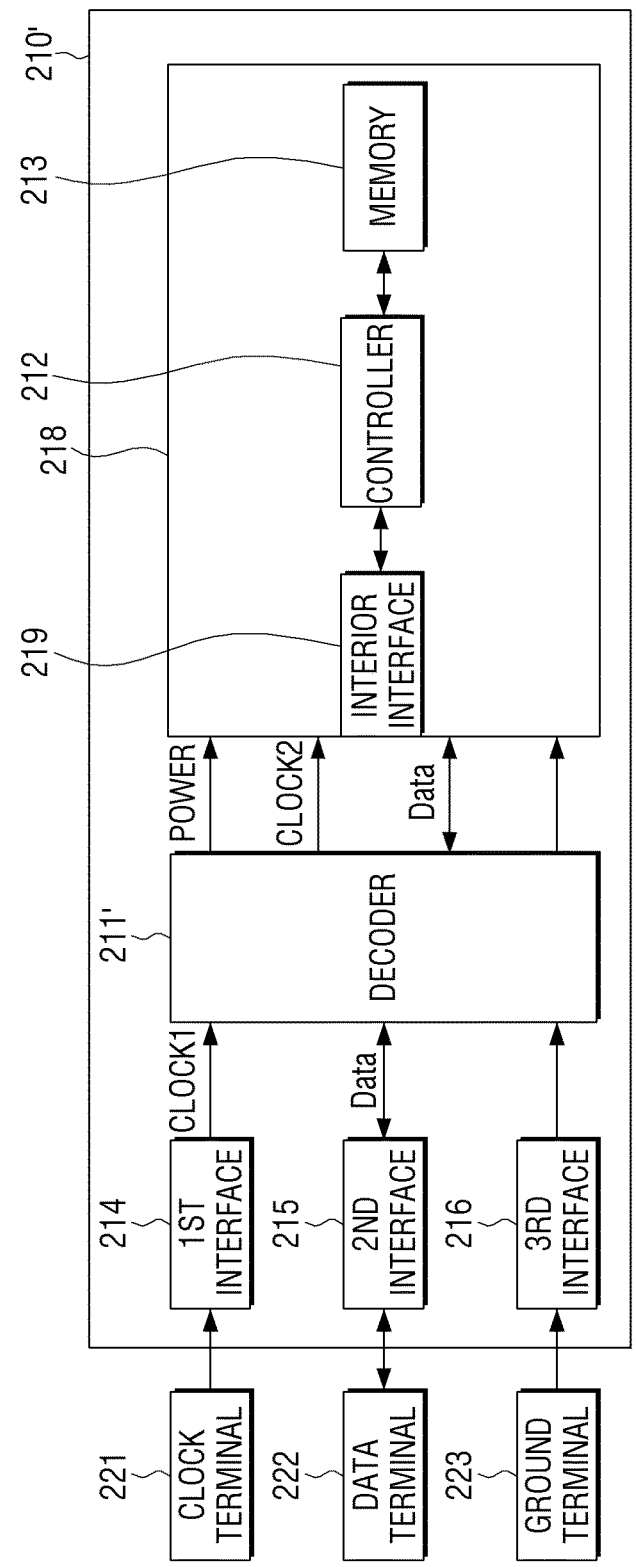
FIG. 9 is a detailed block diagram of a CRUM unit according to another embodiment.

FIG. 9 is a detailed block diagram of a CRUM unit according to another embodiment.

Referring to FIG. 9, the CRUM unit 210' includes the first to the third interfaces 214, 215, 216, the decoder 211' and the controlling unit 218. Herein, because the other units than the decoder 211' are same as the units of the CRUM unit 210 in FIG. 8, the other units than the decoder 211' will not be specifically explained below.

The decoder 211' may receive the first clock signals generated from the body 100 of the image forming apparatus through the consumable unit 200, and convert the received first clock signals into the second clock signals. The specific converting operation is described above, which will not be further explained below.

The decoder 211' may extract the power from the received first clock signals. The decoder 211' may provide the extracted power to each unit within the CRUM unit 210' (e.g., controlling unit).

The decoder 211' may by-pass the data signals received through the second interface 215 and provide to the controlling unit 218. Meanwhile, although the above describes that the data signals are provided to the controlling unit 218 through the decoder 211', the data signals may be directly provided to the controlling unit 218 without passing through the decoder 211' in certain implementation.

Figure 10:
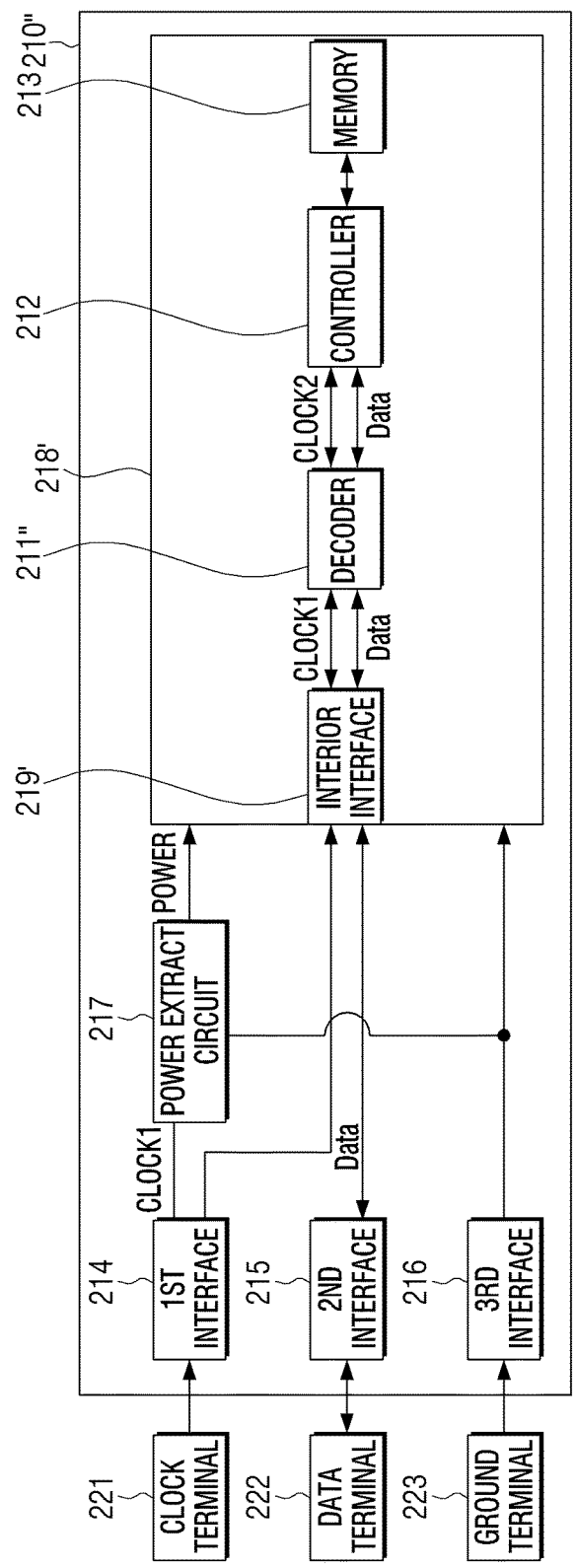
FIG. 10 is a detailed block diagram of a CRUM unit according to yet another embodiment.

FIG. 10 is a detailed block diagram of a CRUM unit according to another embodiment.

Referring to FIG. 10, the CRUM unit 210" includes the first to the third interfaces 214, 215, 216, the power extract circuit 217 and the controlling unit 218'. Herein, because the other units than the controlling unit 218' are same as the units of the CRUM unit 210 in FIG. 8, the other units than the controlling unit 218' will not be specifically explained below.

The controlling unit 218' includes the interior interface 219', the decoder 211", the controller 212 and the memory 213. The controlling unit may consist of one IC, or scattered and consisting of a plurality of IC. Herein, the controller 212 and the memory 213 are same as the units of FIG. 8 except for the interior interface 219' and the decoder 211", which will not be specifically explained below.

The interior interface 219' may receive the inputting of the power delivered from the power extract circuit 217, may receive the inputting of the first clock signals delivered from the first interface 214, may receive the inputting of the data signals delivered from the second interface 215, and may be ground through the third interface 216.

The decoder 211" may convert the received first clock signals through the interior interface 219' into the second clock signals compatible with I2C protocols. Further, the decoder 211" may provide the converted second clock signals to the controller 212.

The decoder 211" may by-pass the data signals received through the interior interface 219" and provide to the controller 212. Meanwhile, although the above describes that the data signals are provided to the controller 212 through the decoder 211", the data signals may be provided to the controller 212 without passing through the decoder 211" in certain implementation.

Figure 11:
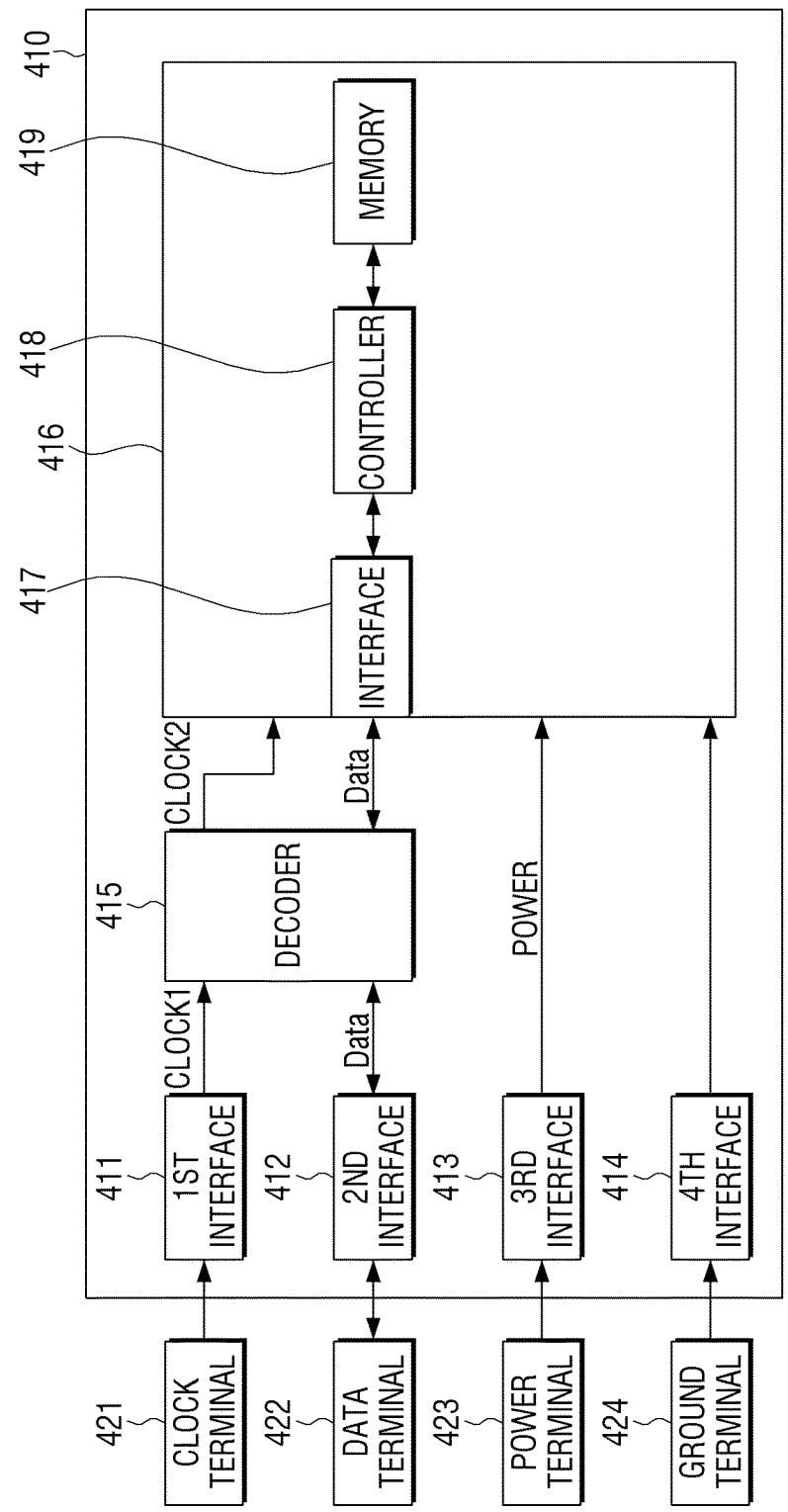
FIG. 11 is a detailed block diagram of a CRUM unit according to yet another embodiment.

FIG. 11 is a detailed block diagram of a CRUM unit according to another embodiment.

Referring to FIG. 11, CRUM unit 410 may include the first to the fourth interfaces 411, 412, 413, 414, the decoder 415, and the controlling unit 416.

The consumable unit may be standardized with the four terminals 421, 422, 423, 424. Therefore, the CRUM unit 410 may include the four interfaces 411, 412, 413, 414 corresponding to the consumable unit.

The first to the fourth interfaces 411, 412, 413, 414 may be respectively connected to the clock terminal 421, the data terminal 422, the power terminal 423, and the ground terminal 424, and may communicate with the image forming apparatus.

Specifically, the first interface 411 may receive the first clock signals from the image forming apparatus through the clock terminal 421, and the second interface 412 may transmit and receive the data signals from the body 100 through the data terminal 422. Further, the third interface 413 may be connected to the power terminal 423, and the fourth interface 414 may be connected to the ground terminal 424.

Meanwhile, the first interface 411 may be connected to the decoder 415, and deliver the first clock signals to the decoder 415.

Further, the second interface 412 may be connected to the decoder 415, and deliver the data signals to the decoder 415. Meanwhile, although the above describes that the data signals are provided to the controlling unit 416 through the decoder 415, the data signals may be provided to the controlling unit 416 without passing through the decoder 415, in certain implementation.

The third interface 413 may provide the power to each unit within the CRUM unit 410 requesting the power.

Further, the fourth interface 414 may be connected to the ground within CRUM unit 410.

The decoder 415 may convert the first clock signals delivered through the first interface 411 into the second clock signals, and provide to the controlling unit 416.

The controlling unit 416 is same as the controlling unit 218 shown in FIG. 8, which will not be further explained regarding specific constitution and operation of the controlling unit 416.

According to the embodiments as described above, the CRUM unit 410 may be connected to the body through the four terminals, and satisfy the standard of the consumable unit 400 consisting of the four terminals.

Meanwhile, the CRUM unit 410 may be mounted on the consumable unit consisting of the four terminals which is currently commercialized, and compatible with a related CRUM unit.

Figure 12:
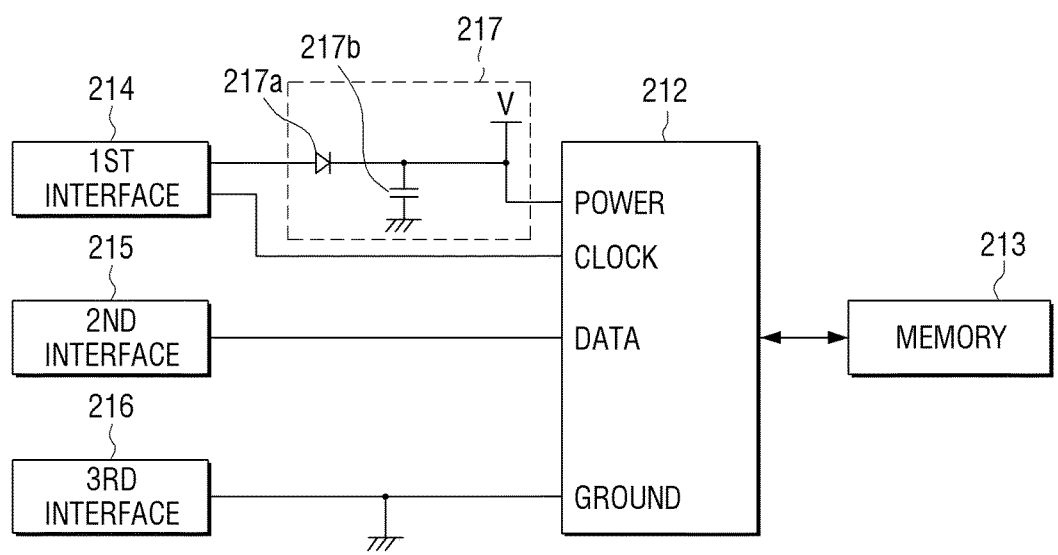
FIGS. 12 and 13 are circuit diagrams illustrating examples of power extract circuit shown in FIG. 8.
Figure 13:
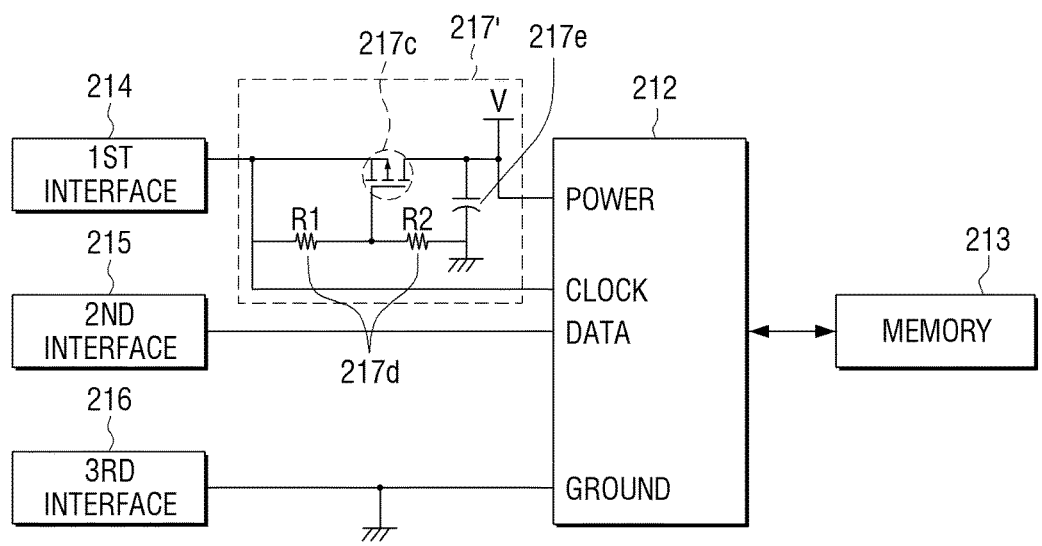

FIGS. 12 and 13 are circuit diagrams describing the power extract circuit of CRUM unit shown in FIG. 8. Specifically, FIG. 12 illustrates the power extract circuit according to an embodiment, and FIG. 13 illustrates the power extract circuit according to another embodiment.

Referring to FIG. 12, the power extract circuit 217 may include the diode 217a and the capacitor 217b.

Regarding the diode, an anode may be connected to the first interface 214, and a cathode may be commonly connected to one end of the capacitor 217b and a power end of the CRUM unit 210. Therefore, the diode 217a may pass the clock signals having a high value on the idle section and the data section of the first clock signals delivered through the first interface 214. Meanwhile, although the embodiment may pass a high value of the clock signals to the capacitor 217b by using the diode 217a, another element that can pass a voltage more than specific electrical potential, e.g., another switch element such as FET may be used in certain implementation.

One end of the capacitor 217b may be commonly connected to the cathode of the diode 217a and the power end of the CRUM unit 210, and the other end of the capacitor 217b may be connected to the ground end of the CRUM unit 210. By being connected, the capacitor 217b may charge the power by using a high value delivered through the diode 217a, and provide the power to each unit within the CRUM unit 210. The above describes that the power may be charged by using the capacitor. However, another capacitive element than the capacitor may be used, or a second power such as battery may be used in certain implementation.

Meanwhile, the above describes that the diode 217a may pass the clock signals having a high value on both the idle section and the data section; however, it may not be limited to herein. For example, when the clock signals are received according to another embodiment, the clock signals having a high value may be passed on the data section while the clock signals having a second low value may be passed on the idle section. In this case, a second low value may be above zero, and less than a high value. Further, a second low value may have the power to drive CRUM unit 210, which may be 2.7V or 3.0V.

Meanwhile, the power extract circuit 217 may not be limited to FIG. 12, and also may be constituted according to FIG. 13.

Referring to FIG. 13, the power extract circuit 217' may include the switching element 217c, the series-connected resistance 217d, and the capacitor 217e.

One end of the switching element 217c may be connected to the first interface 214, and the other end may be connected to one end of the capacitor 217e. Further, the switching element 217c may be switch-controlled by the voltage of a middle node in the series-connected resistance 217d. Meanwhile, the series-connected resistance 217d may be arranged between the ground end and the first interface 214, and the switching element 217c may pass the clock signals having a high value by operating the on/off switching according to the clock signals.

One end of the capacitor 217e may be commonly connected to the other end of the switching element 217c and the power end of the CRUM unit 210, and the other end of the capacitor 217e may be connected to the ground end of the CRUM unit 210. By being connected, the capacitor 217e may charge the power by using a high value delivered through the switching element 217c, and provide the power to each unit within CRUM unit 210.

Meanwhile, the above describes that the switching element may switch-on on a high value section of the clock signals having a high value on both the idle section and the data section, and pass a high value; however, it may not be limited to herein. For example, when the clock signals are received according to another embodiment, the clock signals having a high value may be passed on the data section while the clock signals having a high value or a second low value may be passed on the idle section.

When explaining FIGS. 12 and 13, the outputting of the power extract circuit may be directly connected to the controller 212. However, the power extract circuit may be connected to or arranged within the decoder 211, in which the decoder may deliver the power to other units within the CRUM unit, in certain implementation.

Figure 14:
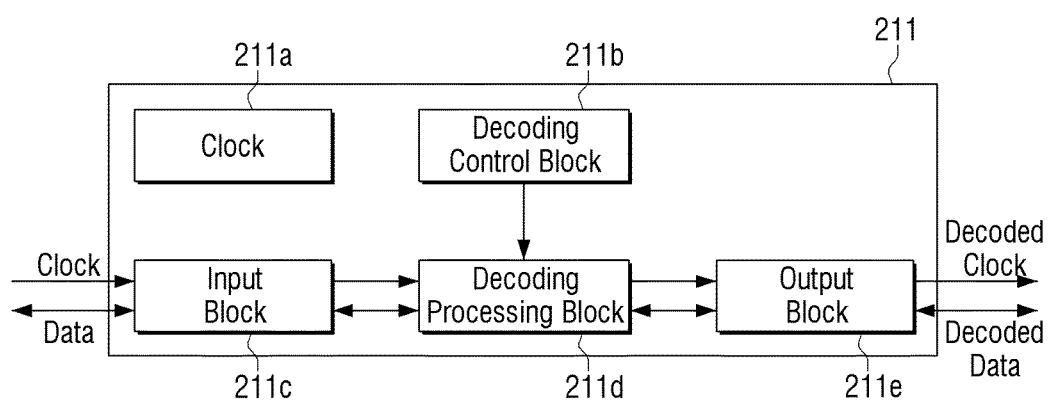
FIG. 14 illustrates specific constitution of the decoder in FIG. 7.

FIG. 14 illustrates specific constitution of the decoder in FIG. 7.

Referring to FIG. 14, the decoder 211 may include a clock unit 211a, a decoding controller 211b, an input 211c, a decoding processor 211d, and an output 211e.

The clock unit 211a may generate clocks of a predetermined frequency.

The decoding controller 211b may store standard time information. Herein, the standard time information may be time information of determining conditions (or comparing conditions) during the decoding process (e.g., T_Value, T_Cut, T_Change). Herein, T_Value may be value to be used in generating T_Cut and T_Change.

Meanwhile, the above describes that the decoding controller 211b may store the time information. However, in certain implementation, the clock unit 211a may store the standard time information with information regarding a clock number of the clocks generated in the clock unit 211a in order to create the above time (or frequency).

The input 211c may receive the inputting of the first clock signals. Specifically, the input 211c may be connected to the first interface 214 and receive the inputting of the first clock signals from the first interface 214.

Further, the input 211c may receive the inputting of the data signals. Specifically, the input 211c may receive the data signals from the second interface 215. Further, the input 211c may output the data signals of the controller 212 delivered from the output 211e to the second interface 214.

The decoding processor 211d may generate the second clock signals based on the standard time information and the first clock signals. Specifically, when a section maintaining one of a high value and a low value regarding the first clock signals exceeds a predetermined time (T_Change), the decoding processor 211d may convert an output value of the second clock signals alternately based on a time corresponding to a first frequency at the time of exceeding the predetermined time. Further, when a section maintaining one of a high value and a low value regarding the first clock signals is less than the predetermined time, the decoding processor 211d may generate the second clock signals by maintaining an output value of the second clock signals.

The output 211e may output the second clock signals generated in the decoding processor 211d. Further, the output 211e may output the data signals inputted to the input 211c as they are.

The decoder 211 according to the above embodiment may convert the clock signals, which are converted for generating the power, into the second clock signals compatible with I2C protocols. Therefore, the CRUM unit may use an existing memory IC operating with I2C protocols.

Figure 15:
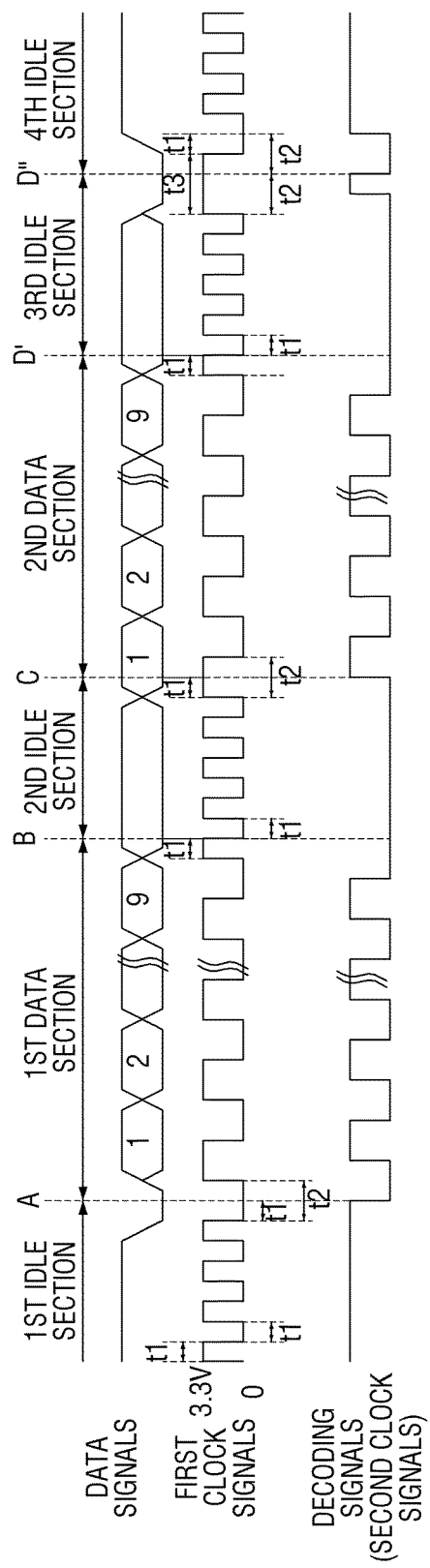
FIGS. 15 to 17 are views provided to explain various examples of wave forms according to data signals, clock signals and decoding signals.

FIGS. 15 to 17 are views provided to explain various examples of wave forms according to the data signals, the clock signals (e.g., the first clock signals), and the decoding signals (e.g., the second clock signals).

Specifically, FIG. 15 illustrates wave forms of the data signals, the clock signals (e.g., the first clock signals), and the decoding signals (e.g., the second clock signals) which are decoded from the clock signals (e.g., the first clock signals).

Referring to FIG. 15, the clock signals may have different clock wave forms to each other on the idle section and the data section, and have different pulsewidths to each other. Specifically, the clock signals may have a first pulsewidth on the data section and a second pulsewidth different from the first pulsewidth on the idle section. In this case, the first pulsewidth may be preferably greater than the second pulsewidth.

Meanwhile, on a first idle section, the clock signals may have a wave form in which a high value based on 1-1 time (t1-1) and a low value based on 1-2 time (t1-2) are alternately repeated. The CRUM unit may extract the power from a high value received for 1-1 time (t1-1) on the first idle section. Herein, a low value may be 0V, and a high value may be 3.3V. However, a low value and a high value may not be limited to the above, and different according to model or specification of the image forming apparatus.

The data signals may not include substantial data on the first idle section. However, the data signals may have a wave form having any one value among a high value and a low value on the first idle section, and a wave form of the data signals may be voluntarily determined on the first idle section. The data signals may have the above features on the other idle sections.

Meanwhile, when a high value based on 1-1 time (t1-1) and a low value based on 1-2 time (t1-2) regarding the clock signals are alternately repeated on the first idle section, and when a section maintaining a low value of the clock signals exceeds a first time (t1), the CRUM unit may be determined the time of exceeding the first time (t1) to be starting time (A) of the transmitting and receiving the data signals. Herein, the starting time (A) of the transmitting and receiving the data signals may be time of informing that the data signals are received from the image forming apparatus.

The first idle section may be changed into a first data section based on the transmitting and receiving starting time (A). In this case, the clock signals may have a wave form in which a high value based on 2-1 time (t2-1) determined longer than the first time (t1) and a low value based on 2-2 time (t2-2) are alternately repeated.

2-1 time (t2-1) may be preferably twice more than 1-1 time (t1-1). However, it may not be limited to the above. 2-1 time (t2-1) may be time (t) of extracting the power sufficient to drive the CRUM unit for one period from a high value of the clock signals. When 2-1 time (t2-1) is shorter than the time (t), CRUM unit may not be driven because the power may not be remained. Therefore, a second time (t2) may be established to be uniform to or longer than the time (t).

Meanwhile, when a high value and a low value regarding the clock signals are alternately repeated on the first data section, and when a high value of the clock signals has 1-1 time (t1-1), the CRUM unit may be determined a time when a high value of the clock signals become 1-1 time (t1-1) to be first section changing time (B) when a section is changed into a second idle section.

Meanwhile, the time when a section is changed into the second idle section is different from a time when a next section is changed into another idle section. Thus, when a high value based on 2-1 time (t2-1) and a low value based on 2-2 time (t2-2) are alternately repeated on the first data section, and when a high value of the clock signals has 1-1 time (t1-1), the CRUM unit may recognize that another data section is continued after the idle section. Therefore, the CRUM unit may maintain the activating state in connecting with the image forming apparatus.

Meanwhile, the clock signals may have a wave form in which a high value based on 1-1 time (t1-1) and a low value based on 1-2 time (t1-2) are alternately repeated on the second idle section.

When a high value based on 1-1 time (t1-1) and a low value based on 1-2 time (t1-2) are alternately repeated on the second idle section, and when a section maintaining a high value of the clock signals exceeds 1-1 time (t1-1), the CRUM unit may be determined that a second data section starts at the time of exceeding 1-1 time (t1-1). Thus, CRUM unit may be determined the time of exceeding 1-1 time (t1-1) to be second section changing time (C).

On the second data section, the clock signals may have a wave form in which a high value based on 2-1 time (t2-1) and a low value based on 2-2 time (t2-2) are alternately repeated. When a high value based on 2-1 time (t2-1) and a low value based on 2-2 time (t2-2) are alternately repeated in the clock signals on the second data section, and when a high value of the clock signals has 1-1 time (t1-1), CRUM unit may recognize that a third idle section is continued after the second data section.

Thus, the CRUM unit may recognize the time when a high value of the clock signals becomes 1-1 time (t1-1) to be third section changing time (D) when the second data section is changed into the third idle section.

Meanwhile, on the third idle section following after the second data section, the clock signals may have a wave form in which a high value based on 1-1 time (t1-1) and a low value based on 1-2 time (t1-2) are alternately repeated.

When a time maintaining a high value of the clock signals exceeds 2-1 time (t2-1), the CRUM unit may recognize the time when a high value exceeds 2-1 time (t2-1) to be time (D") of finishing the receiving the data signals.

Based on the receiving finish time (D"), the CRUM unit and the image forming apparatus may be connected while being stand-by status and the receiving operation of the data signals may be finished. When CRUM unit is connected to the image forming apparatus at the stand-by status, the data signals may not received from the image forming apparatus. Thus, a section may be changed into a fourth idle section.

Although FIG. 15 explains that the two data sections are included; however, it may not be limited to the above. When an amount of the data to be transmitted and received is greater, the idle section and the data section may be included repeatedly more than three times. Further, when an amount of the data to be transmitted and received is smaller, the third idle section and the second data section may not be included.

As described above, because the data transmitting and receiving time is created with the length of the clock signals, the second time which is clock signal length of the data effective section should be longer than the first time, and the data transmitting and receiving time should be determined to be time of exceeding the first time for the constant data transmitting and receiving.

Further, although the above describes that a low section and a high section regarding the clock signals are same in terms of length, there may be difference in that lengths of the low section and the high section may be respectively less than the first time on the idle section while lengths of the low section and the high section may be respectively more than the second time on the data section.

Meanwhile, the CRUM unit may decode the data signals based on the clock signals, and generate the decoding signals as a result of decoding. Such decoding operation may be performed by the interface controller 212 included in the CRUM unit.

Referring to FIG. 15, when receiving the clock signals (e.g., first clock signals) in which a high value and a low value change based on the first time (t1) like in the first to the third idle sections, constant decoding signals (e.g., second clock signals) may be generated with one value of "0" and "1" because the data signals are not received. When receiving the clock signals in which a high value and a low value exceed the first time (t1) like in the first and the second data sections, the data section may be recognized.

Therefore, on the first and the second data sections, the decoding signals having a wave form, in which "0" and "1" are alternately repeated at each time when a high value and a low value of the clock signals exceed the first time (t1), may be generated.

As a result, the decoding signals of FIG. 15 may have a wave form in which one of "0" and "1" is constantly maintained on the first to the third idle sections and "0" and "1" are alternately repeated according to the second time (t2) on the first and the second data sections.

Meanwhile, FIG. 15 describes that a low value included in the clock signals has zero on the data section and the idle section; however, it may not be limited to herein. Thus, a low value may have a value above zero and less than 3.3V which is a high value on the data section and the idle section. The decoding signals regarding the above case may be uniform to that shown in FIG. 15.

Although FIG. 15 describes that the third idle section is connected right after the second data section, it may not be limited to the above. Specifically, the second idle section may be connected right after the second data section according to software generating the clock signals.

FIG. 16 illustrates wave forms of the data signals, the clock signals according to another embodiment and the decoding signals decoded from the data signals.

Referring to FIG. 16, the clock signals may have a wave form in which a high value is constantly maintained on a first idle section. The data signals may not have any substantial data and may have a wave form in which any one of a high value and a low value may be obtained on the first idle section. The above is same as the other idle sections.

When a high value is maintained for a second time (t2) longer than a first time (t1) and changed into a first low value on the first idle section, the CRUM unit 210 may determine a time when a high value is changed into a first low value to be starting time (E) of the receiving the data signals. At this receiving starting time (E), the image forming apparatus and CRUM unit may finish the stand-by status for receiving the data signals and may be connected to be activating state. Herein, a high value may be 3.1~3.7V, and a low value may be above zero and less than a high value, which may be 2.7~3.0V. However, a high value and a low value may not be limited to the above; they may be different according to model or specification of the image forming apparatus.

Based on the receiving starting time (E), the first idle section may be changed into a first data section. On the first data section, the clock signals may have a wave form in which a high value and a low value are alternately repeated based on the first time (t1). The first time (t1) may have a predetermined time according to the protocols between the image forming apparatus and the CRUM unit, and the second time (t2) may be longer than the first time (t1) without the separately determined time.

When a high value and a low value are alternately repeated based on the first time (t1) and when a low value of the clock signals exceeds the first time (t1), the CRUM unit may be determined a time when a low value exceeds the first time (t1) to be first section changing time (F) when the first data section is changed into a second idle section.

Meanwhile, on the second idle section, the clock signals may have a wave form in which a low value is constantly maintained. When a low value is constantly maintained and changed into a high value on the second idle section, the CRUM unit may recognize a time when a low value is changed into a high value to be second section changing time (G). Thus, based on the second section changing time (G), the second idle section may be changed into a second data section.

Although FIG. 16 describes that the second idle section and the second data section are included one by one, it may not be limited to herein. When an amount of the data to be transmitted and received is greater, the second idle section and the second data section may be included repeatedly more than two times. Further, when an amount of the data to be transmitted and received is smaller, the second idle section and the second data section may not be included.

When a high value and a low value of the clock signals are alternately repeated on the second data section, and when a high value exceeds the first time (t1), the CRUM unit may be determined a time when a high value exceeds the first time (t1) to be finishing time (H) of the receiving the data signals.

Based on the receiving finishing time (H), the CRUM unit and the image forming apparatus may be connected in the stand-by status, and the receiving operation of the data signals may be finished. When the CRUM unit is connected to the image forming apparatus in the stand-by status, the data signals may not be received from the image forming apparatus. Thus, a section may be changed into a third idle section.

Therefore, the CRUM unit may be determined the receiving starting time (E), the first and the second section changing times (F, G), and the receiving finishing time (H), and perform the transmitting and receiving the data signals and the extracting the power.

Meanwhile, the CRUM unit may decode the data signals based on the clock signals and generate the decoding signals as a result of decoding.

Referring to FIG. 16, because the data signals are not received on the first, the second and the third idle sections, the constant decoding signals may be generated with one of "0" and "1."

Further, when receiving the clock signals having a high value and a low value of the first time (t1) as in the first and the second data sections, the data sections may be recognized.

Therefore, a high value and a low value of the clock signals may be alternately repeated according to the first time (t1) on the first and the second data sections. Therefore, the decoding signals having a wave form in which "0" and "1" are alternately repeated according to the first time (t1) may be generated.

As a result, the decoding signals of FIG. 16 may have a wave form in which one of "0" and "1" is constantly maintained on the first to the third idle sections, and "0" and "1" are alternately repeated according to the first time (t1) on the first and the second data sections.

Meanwhile, although FIG. 16 describes that a low value on the first to the third idle sections is uniform to a low value on the first and the second data sections, it may not be limited to herein. In other words, a low value on the first to the third idle sections may be 2.7V~3V while a low value on the first and the second data sections may be zero. The decoding signals regarding such case may be same as shown in FIG. 16.

Meanwhile, the third idle section of FIG. 16 may not be necessarily requested, and selectively included according to programming methods of the image forming apparatus or the software. When there is no third idle section, the CRUM unit may finish the transmitting and receiving operation of one data set at the receiving finishing time (H). Further, the CRUM unit may repeat the first idle section in order to start the transmitting and receiving operation of another data set.

Further, FIG. 16 illustrates and describes that the third idle section may be connected right after the second data section. However, it may not be limited to the above. Specifically, the second idle section may be connected right after the second data section according to software generating the clock signals. The relevant will be explained below by referring to FIG. 17.

FIG. 17 illustrates a modifying example of the above embodiment.

Although FIG. 17 does not illustrate a first idle section and a first data section, they are same as shown in FIG. 16, and a second idle section may be also same as shown in FIG. 16.

When a high value and a low value of the clock signals are alternately repeated based on the first time (t1) on a second data section, and when a low value exceeds the first time (t1), the CRUM unit may recognize that the second idle section may be continued right after the second data section.

Therefore, the CRUM unit may be determined a time when a high value of the clock signals exceeds the first time (t1) to be third section changing time (H') when a section is changed into the second idle section again.

Meanwhile, the clock signals may have a wave form in which a low value is constantly maintained on the second idle section following after the second data section. When a low value is constantly maintained on the second idle section, changed into a high value, and this high value exceeds the first time (t1), the CRUM unit may recognize a time of exceeding the first time (t1) to be finishing time (H") of the receiving the data signals.

Based on the receiving finishing time (H"), the CRUM unit and the image forming apparatus may be connected in the stand-by status, and the receiving operation of the data signals may be finished. When the CRUM unit is connected to the image forming apparatus in the stand-by status, the data signals may not be received from the image forming apparatus. Thus, a section may be changed into a third idle section.

Figure 18:
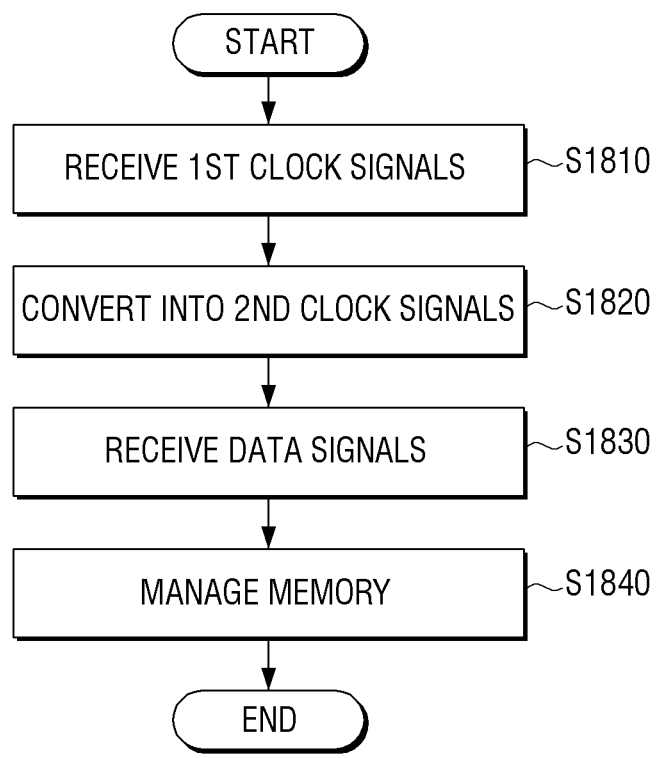
FIG. 18 is a flowchart provided to explain a method of delivering the data signals according to an embodiment.

FIG. 18 is a flowchart explaining a method of delivering the data signals according to an embodiment.

Referring to FIG. 18, the first clock signals may be received at S1810. Specifically, the first clock signals having a first frequency on the data section and a second frequency on the idle section may be received from the body of the image forming apparatus. Meanwhile, the embodiment describes that the data section and the idle section may have predetermined frequencies. However, when the body of the image forming apparatus generates the clock signals shown in FIG. 16, only the data section may have a predetermined frequency.

At S1820, the received first clock signals may be converted into the second clock signals. Specifically, the received first clock signals may be converted into the second clock signals in which a high value or a low value may be maintained on the idle section. More specifically, when a section maintaining one of a high value and a low value regarding the first clock signals exceeds a predetermined time (T_Change), an output value is changed alternately based on a time corresponding to the first frequency at the time of exceeding the predetermined time. When a section maintaining one of a high value and a low value is less than a predetermined time (T_Cut), the second clock signals may be generated by maintaining an output value of the second clock signals. Specific converting method will be explained below by referring to FIG. 19.

At S1830, the data signals may be transmitted and received using the second clock signals. Specifically, when an edge of the second clock signals changes on the idle section, a section may be determined to be changed into the data section, and the data signals may be transmitted and received. Meanwhile, when a section maintaining one of a high value and a low value regarding the second clock signals exceeds the predetermined second time on the data section, it may be determined that the data section is changed into the idle section, and finish the transmitting and receiving the data signals.

At S1840, the memory storing the data related with the consumable unit is managed, using the received data signals. Specifically, information may be recorded on the memory according to the received data signals on the data section, or the information stored in the memory may be transmitted and received with the body.

The above-explained method of delivering the data signals according to an embodiment may convert the first clock signals transmitted incompatibly with the clock protocols of I2C bus into the second clock signals compatibly with the clock protocols of I2C bus, and use. Therefore, the CRUM unit may be implemented by using a related existing universal IC operating with I2C bus. The data signal delivering method of FIG. 19 may be implemented in the image forming apparatus of FIG. 1 or in the CRUM unit of FIGS. 7 to 11. Further, the above method may be implemented in another image forming apparatus or the CRUM unit.

The data signal delivering method as described above may be implemented to be program (or application) including algorithms that can run in a computer, and the program may be stored and provided on non-transitory computer readable recording medium.

Non-transitory computer readable recording medium indicate medium which store data semi-permanently and can be read by devices, not medium storing data temporarily such as register, cache, or memory. Specifically, the above various applications or programs may be stored and provided in non-transitory computer readable recording medium such as CD, DVD, hard disk, Blu-ray disk, USB, memory card, or ROM.

Figure 19:
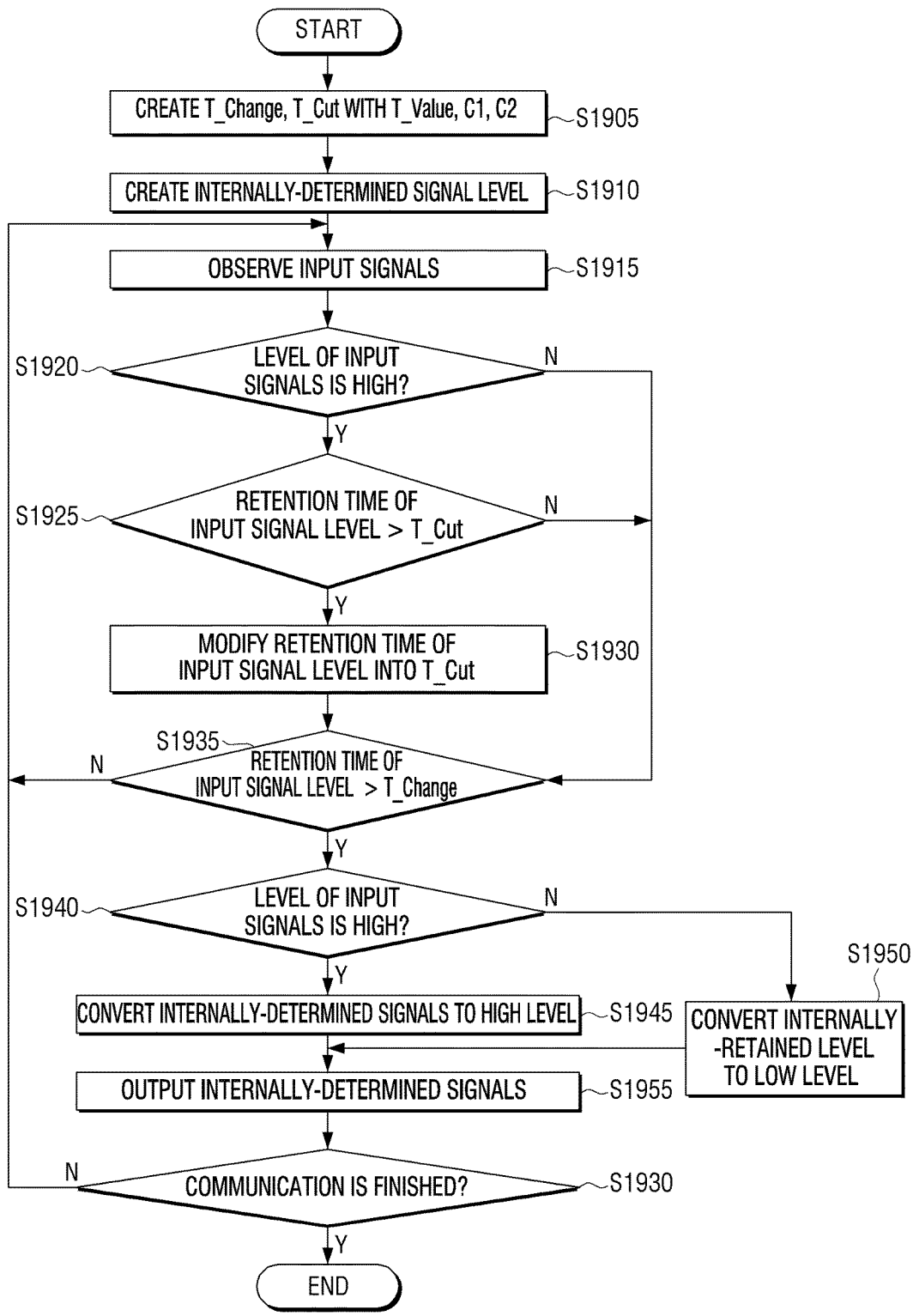
FIG. 19 is a flowchart provided to explain in detail the converting operation of FIG. 18.

FIG. 19 is a flowchart specifically explaining the converting operation of FIG. 18.

Referring to FIG. 19, T_Change and T_Cut may be created by using the previously stored standard time information (T_Value, C1, C2) at S1905. Herein, T_Value is variable including the standard time information which may be stored in a table format within the decoder, and changed by using another external controlling method. Further, C1 and C2 may be variables between 0 and 1 which may be stored and provided within the decoder, or defined to be fixed value.

Further, T_Cut is variable for the analyzing internally, which may be created by multiplying T_Value with C1. Further, T_Change is variable for the analyzing internally which may be created by multiplying T_Cut with C2.

At S1910, a level of the internally-determined signals may be determined. Specifically, it may be determined whether an output value of the second clock signals may have a high value or a low value, and output the signals according to the determining.

The input signals may be observed at S1915, and it may be determined whether a level of the input signals has a high value according to the observing result at S1920.

As a determining result, when a level of the input signals has a high value at S1920—Y, it may be determined whether the retention time of the high value is longer than the previously created T-Cut at S1925. On the contrary, when a level of the input signals does not have a high value at S1920—N, or when the retention time of the high value is shorter than T_Cut at S1925—N, operation may move on to S1935 to determine the retention time of the input signals at S1935. In other words, the currently input signals may be determined to be idle section, and the internally-determined signals may be determined not to change.

As a determining result, when the retention time regarding a high value of the input signals is longer than T_Cut at S1925—Y, the retention time of the input signals may be changed into T_Cut at S1930.

At S1935, it may be determined whether the retention time of a high value or a low value is longer than T_Change.

As a determining result, when the retention time of a high value or a low value is shorter than T_Change at S1935—N, the previous observing may be performed again at S1915. Specifically, when the level retention time of the first clock signals is currently shorter than T_Change, the second clock signals may maintain a low value or a high value because a current section is the idle section in which the data signals are not transmitted and received.

On the contrary, when the retention time of a high value or a low value is longer than T_Change at S1935—Y, it may be determined whether a level of the input signals is a high value or not at S1940. Specifically, when the retention time regarding a level of the input signals is longer than T_Change, the internally-determined signals (or current outputting status of the second clock signals) may be converted to be high at S1945. When the internally-determined signals are maintained to be high, the level may be maintained to be high. When the internally-determined signals are low, the level may be converted to be high. On the contrary, when the input signals are low, a level of the internally-determined signals may be converted to be low at S1950. When the internally-determined signals are low, the level may be maintained to be low. When the internally-determined signals are high, the level may be converted to be low.

At S1955, the clock signals may be outputted according to the internally-determined signals determined at the previous steps.

The above process may be repeated until the communication is finished at S1960.

The converting operation according to an embodiment may convert the first clock signals transmitted incompatibly with the clock protocols of I2C bus into the second clock signals compatibly with the clock protocols of I2C bus, and use. Therefore, the CRUM unit may be implemented by using a related existing universal IC operating with I2C bus. The converting method of FIG. 20 may be performed on the decoder of FIG. 14, or on another decoder.

Further, the data converting operation described above may be implemented to be program including algorithms that can run on a computer, and the program may be stored and provided in ASIC.

Further, the foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A customer replacement unit monitor (CRUM), comprising:
   a memory to store data related with a consumable unit;
   a controller to,
   receive a first clock signal and a data signal from an image forming apparatus,
   perform a comparison of the first clock signal to a predetermined time,
   convert through a decoding the received first clock signal into a second clock signal based on the comparison of the first clock signal to the predetermined time, and
   transmit and receive data, and manage the memory based on the converted second clock signal; and
   a power extracting circuit to extract power from the first clock signal during an idle section having different pulse widths than a data section,
   wherein the first clock signal is divided into the data section and the idle section having different pulse widths, and
   wherein the second clock signal is to maintain a high value or a low value in the idle section.

2. The CRUM of claim 1, wherein the first clock signal is divided into the data section in which the data signal is transmitted from the image forming apparatus and received by the CRUM unit and the idle section in which the data signal is not transmitted from the image forming apparatus and received by the CRUM unit, the first clock signal having a first frequency in the data section and a second frequency in the idle section.

3. The CRUM of claim 2, wherein the first frequency of the first clock signal in the data section is lower than the second frequency of the first clock signal in the idle section.

4. The CRUM of claim 3, wherein to perform the decoding, the controller converts an output value of the second clock signal alternately based on a time corresponding to the first frequency when a respective clock signal of the first clock signal maintains either a high value or a low value for more than the predetermined time.

5. The CRUM of claim 1, wherein the second clock signal is compatible with clock protocols of inter-integrated circuit (I2C) bus.

6. The CRUM of claim 1, wherein the controller stores a reference time information, and generates the second clock signal based on the stored reference time information and the first clock signal.

7. The CRUM of claim 1, wherein the controller divides a data section or an idle section of the data signal based on the second clock signal, and transmits and receives the data signal in the data section of the second clock signal.

8. The CRUM of claim 7, wherein the controller determines that the data signal is changed into the data section when an edge of the second clock signal changes, and determines that the data signal is changed into the idle section when a respective clock signal of the second clock signal maintains either the high value or the low value for more than a predetermined time.

9. A customer replacement unit monitor (CRUM), comprising:
a memory to store data related with a consumable unit;
a controller to,
perform a comparison of a first clock signal received from an image forming apparatus to a predetermined time,
convert through a decoding the first clock signal into a second clock signal based on the comparison of the first clock signal to the predetermined time, and
manage the memory based on the converted second clock signal; and
a power extracting circuit to extract power from the first clock signal during an idle section having different pulse widths than a data section,
wherein the first clock signal is divided into the data section and the idle section having different pulse widths, and
wherein the controller according to the decoding processes a data signal received from the image forming apparatus in synchronization with a data section of the second clock signal corresponding to the data section of the first clock signal.

10. An apparatus, comprising:
a consumable apparatus to be involved in an image forming job; and
a Customer Replacement Unit Monitor (CRUM) circuitry to store data related with the consumable apparatus and to receive a first clock signal from an image forming apparatus;
wherein the first clock signal is divided into a data section and an idle section having different pulse widths, and
wherein the CRUM circuitry performs a comparison of the first clock signal to a predetermined time, converts according to a decoding the first clock signal into a second clock signal based on the comparison of the first clock signal to the predetermined time, the second clock signal being a clock signal maintaining a high value or a low value in the idle section, extracts power from the first clock signal during the idle section, and processes a data signal received from the image forming apparatus using the second clock signal.

11. The consumable apparatus to claim 10, wherein the consumable apparatus is any one of an electrification device, a light exposure device, a developing device, a transfer device, a settlement device, a roller, a belt, and an OPC drum.

* * * * *